(12) United States Patent
Sato et al.

(10) Patent No.: US 7,555,043 B2
(45) Date of Patent: Jun. 30, 2009

(54) IMAGE PROCESSING APPARATUS AND METHOD

(75) Inventors: Kazushi Sato, Chiba (JP); Teruhiko Suzuki, Chiba (JP); Kuniaki Takahashi, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1060 days.

(21) Appl. No.: 10/408,455

(22) Filed: Apr. 8, 2003

(65) Prior Publication Data

US 2004/0213470 A1 Oct. 28, 2004

(30) Foreign Application Priority Data

Apr. 25, 2002 (JP) ............................. 2002-124924
Jul. 16, 2002 (JP) ............................. 2002-207610

(51) Int. Cl.
*H04B 1/66* (2006.01)
(52) U.S. Cl. ............................................ 375/240.16
(58) Field of Classification Search ............ 375/240.02, 375/240.03, 240.12, 240.1, 240, 240.16, 375/240.13; 382/238, 234, 236; 348/452; *H04B 1/66*
See application file for complete search history.

(56) References Cited

U.S. PATENT DOCUMENTS

| | | | | |
|---|---|---|---|---|
| 5,488,419 A * | 1/1996 | Hui et al. | ............... | 375/240.17 |
| 5,587,741 A * | 12/1996 | Kim | ............... | 375/240.17 |
| 5,657,087 A * | 8/1997 | Jeong et al. | ............... | 375/240.16 |
| 5,719,630 A * | 2/1998 | Senda | ............... | 375/240.17 |
| 6,011,870 A * | 1/2000 | Jeng et al. | ............... | 382/236 |
| 6,188,727 B1 * | 2/2001 | Lee | ............... | 375/240.03 |
| 6,256,348 B1 * | 7/2001 | Laczko et al. | ............... | 375/240.15 |
| 6,580,830 B1 * | 6/2003 | Sato et al. | ............... | 382/238 |
| 7,042,512 B2 * | 5/2006 | Yang et al. | ............... | 348/452 |
| 2003/0103568 A1 * | 6/2003 | Lee et al. | ............... | 375/240.16 |
| 2003/0156646 A1 * | 8/2003 | Hsu et al. | ............... | 375/240.16 |
| 2004/0062307 A1 * | 4/2004 | Hallapuro et al. | ............... | 375/240.13 |
| 2004/0247190 A1 * | 12/2004 | Hagai et al. | ............... | 382/238 |

FOREIGN PATENT DOCUMENTS

JP 3861698 10/2006

* cited by examiner

*Primary Examiner*—Tung Vo
(74) *Attorney, Agent, or Firm*—Oblon, Spivak, McClelland, Maier & Neustadt, P.C.

(57) ABSTRACT

A 6-tap filter circuit and a 4-tap filter circuit generate interpolation pixel signals of an image signal S40. A selection circuit selects one of the 6-tap filter circuit and the 4-tap filter circuit based on a filter selection signal S34 according to the block size of a motion vector to be generated in a motion-vector generating circuit.

3 Claims, 26 Drawing Sheets

IMAGE PROCESSING APPARATUS AND METHOD

BACKGROUND OF THE INVENTION

1. Field of the Invention

The present invention relates to an image processing apparatus and method for coding or decoding images.

2. Description of the Related Art

For transmitting and storing information with high efficiency, apparatuses for digital-compressing image data according to orthogonal transform, such as discrete cosine transform (DCT), and motion compensation, in compliance with Moving Picture Experts Group (MPEG), by utilizing the redundancy unique to image information are becoming widespread in information transmitters in, for example, broadcast stations and information receivers in, for example, households.

In particular, MPEG2(ISO/IEC13818-2) is defined as a general-purpose image coding method, and is currently used in widely available applications, such as in professional applications and consumer applications, by covering interlaced scanning images, sequential scanning images, standard resolution images, and high definition images.

By employing the MPEG2 compression method, the high compression ratio and the high image quality can be implemented by providing the coding amount (bit rate) of 4 to 8 Mbps for, for example, standard-resolution interlace scanning images having 720×480 pixels, and by providing the coding amount of 18 to 22 Mbps for, for example, high-resolution interlace scanning images having 1920×1088 pixels.

MPEG2 is mainly used for coding high quality images for broadcasting, and is not compatible with the coding amount (bit rate) lower than MPEG1, namely, it is not compatible with a higher compression ratio. Because of the widespread use of cellular telephones, there is an increasing demand for a coding method for a lower coding amount (higher compression ratio). To meet this requirement, the MPEG4 method was standardized, and the MPEG4 image coding method was acknowledged as ISO/IEC14496-2 in December 1998 as the International Standard.

For image coding, initially, for videoconferencing, H.26L (ITU-T Q6/16 VCEG) is being standardized. Although H.26L requires a greater computation amount for coding and decoding than known coding methods, such as MPEG2 and MPEG4, the higher coding efficiency can be achieved. Currently, as part of the activities of MPEG4, a method for achieving the higher coding efficiency is being standardized as Joint Model of Enhanced-Compression Video Coding based on H.26L by further incorporating features which are not supported by H.26L standards.

In H.26L-standard coding and decoding, motion prediction/compensation is performed with high pixel precision, such as 1/4 or 1/8 pixel precision, for increasing the coding efficiency.

In this case, in motion prediction/compensation, a plurality of pixel signals (pixel data) with integer precision are read from a frame memory, and are interpolated to generate interpolation pixel signals with 1/4 and 1/8 pixel precisions. Then, by using image data with 1/4 and 1/8 pixel precision formed by the pixel signals and interpolation pixel signals, motion vectors are generated.

However, when generating interpolation pixel signals with high pixel precision by using pixel signals read from a frame memory, the pixel signals must be read very frequently from the frame memory depending on the processing of motion vectors. Accordingly, a large, expensive, and wide-band frame memory and a high-performance computation circuit are required, and power consumption is accordingly increased.

The above-described problem is described in detail in the context of a specific example of a known coding apparatus and a known decoding apparatus.

FIG. 1 is a functional block diagram illustrating a known coding apparatus 101. In the coding apparatus 101, an input image signal is first converted into a digital signal in an analog-to-digital (A/D) conversion circuit 501. Then, the frames of the digital signal output from the A/D conversion circuit 501 are rearranged in a frame rearranging circuit 502 according to the GOP (Group of Pictures) structure of the image compression information.

For pictures to undergo intra-coding, image information of the overall frame is input into an orthogonal transform circuit 504, and undergoes orthogonal transform, such as DCT or Karhunen-Loeve transform.

A transform coefficient output from the orthogonal transform circuit 504 is quantized in a quantizing circuit 505.

The quantized transform coefficient output from the quantizing circuit 505 is input into a reversible transform circuit 506, and undergoes reversible coding, such as variable-length coding or arithmetic coding. Then, the resulting transform coefficient is stored in a buffer 507, and is output as compressed image data.

The quantizing rate employed in the quantizing circuit 505 is controlled by a rate control circuit 512. Meanwhile, the quantized transform coefficient output from the quantizing circuit 505 is also input into a dequantizing circuit 508, and further undergoes inverse orthogonal transform in an inverse orthogonal transform circuit 509, resulting in a decoded image signal. The decoded image signal is stored in a frame memory 510.

For pictures to undergo inter-coding, the corresponding image signal is input into a motion prediction/compensation circuit 511. Simultaneously, a reference image signal is read from the frame memory 510, and undergoes motion prediction/compensation in the motion prediction/compensation circuit 511, thereby generating a predictive image signal. The predictive image signal is output to a computation circuit 503, and an image signal, which indicates the difference between the image signal output from the frame rearranging circuit 502 and the predictive image signal output from the motion prediction/compensation circuit 511, is generated, and is output to the orthogonal transform circuit 504.

The motion prediction/compensation circuit 511 outputs a motion vector MV to the reversible coding circuit 506. The motion vector MV undergoes reversible coding, such as variable-length coding or arithmetic coding, in the reversible coding circuit 506, and is inserted into the header of the image signal. The rest of the processing is similar to that of intra-coding.

FIG. 2 is a functional block diagram illustrating a decoding apparatus 102 corresponding to the coding apparatus 101 shown in FIG. 1.

In the decoding apparatus 102 shown in FIG. 2, input image data is stored in a buffer 613, and is then output to a reversible decoding circuit 614. The image data undergoes variable-length decoding or arithmetic decoding in the reversible decoding circuit 614 according to a predetermined image compression information format. If the frame is an inter-coded frame, the motion vector MV stored in the header of the image signal is also decoded in the reversible decoding circuit 614, and the motion vector MV is output to a motion predictive/compensation circuit 620.

A quantized transform coefficient output from the reversible decoding circuit 614 is input into a dequantizing circuit 615 so as to generate a transform coefficient. The transform coefficient undergoes inverse orthogonal transform, such as inverse DCT or inverse Karhunen-Loeve transform in an inverse orthogonal transform circuit 616 according to a predetermined image compression information format. If the frame is an intra-coded frame, the image information which has undergone inverse orthogonal transform is stored in a frame rearranging circuit 618, and is converted into an analog signal in a digital-to-analog (D/A) conversion circuit 619, and is then output.

If the frame is an inter-coded frame, a predictive image signal is generated in the motion predictive/compensation circuit 620 based on the motion vector MV and a reference image signal stored in a frame memory 621. This predictive image signal and the image signal output from the inverse orthogonal transform circuit 616 are added in an adder 617. The rest of the processing is similar to that performed on the intra-coded frame.

In H.26L standards, motion prediction/compensation having high precision, such as 1/4 pixel precision and 1/8 pixel precision, is defined.

1/4-pixel-precision motion prediction/compensation is as follows.

It is now assumed that integer-precision image signals (pixel values) are present at pixel positions (phase) indicated by A in FIG. 3.

Interpolation pixel signals having 1/2 pixel precision corresponding to interpolation positions b are generated by a 6-tap finite impulse response (FIR) filter $\{1, -5, 20, 20, -5, 1\}$, and the resulting signals are clipped in a range [0, 255].

Then, the interpolation pixel signals at the interpolation positions b are input into the above-described FIR filter, and interpolation pixel signals having 1/2 pixel precision corresponding to interpolation positions c are generated. The resulting signals are clipped by a range [0, 255].

Interpolation pixel signals corresponding to interpolation positions d, g, e, and f are then generated by linear interpolation computation.

Subsequently, an interpolation pixel signal corresponding to interpolation position h is generated by averaging interpolation pixel signals at two interpolation positions b located on a diagonal passing through interpolation position h.

Then, an interpolation pixel signal corresponding to interpolation position i is generated by computation by using the pixel signals of the surrounding four pixel positions A.

When performing motion prediction/compensation using a 6-tap FIR filter, in addition to a motion compensation (MC) block, which serves as a unit for motion prediction/compensation, as shown in FIG. 4, pixel signals equivalent to five extra pixels in each row and column of the MC block, i.e., two upper pixels, two left pixels, three lower pixels, and three right pixels, must be extracted from a frame memory.

This overhead results in 1.72265625 (=(21×21)/(16×16)) for the largest 16×16 MC block, and results in 5.0625 (=(9×9)/(4×4)) for the smallest MC block. That is, a greater overhead is generated for a smaller MC block, causing a wider memory band.

SUMMARY OF THE INVENTION

Accordingly, in view of the above background, it is an object of the present invention to provide a smaller, less expensive, lower-power image processing apparatus that can substantially maintain the coding efficiency, and to provide a method for use in such an image processing apparatus.

In order to achieve the above object, according to a first aspect of the present invention, there is provided an image processing apparatus for generating pixel data forming second image data by interpolating pixel data of first image data read from a storage circuit when generating a motion vector of predetermined image data by using the second image data. The image processing apparatus includes: a first processing circuit for generating interpolation pixel data forming the second image data by using pixel data for a first number of pixels of the first image data; a second processing circuit for generating interpolation pixel data forming the second image data by using pixel data for a second number of pixels, which is smaller than the first number of pixels of the first image data; and a selection circuit for selecting one of the first processing circuit and the second processing circuit to generate the interpolation pixel data according to a motion compensation mode.

Preferably, in the image processing apparatus according to the first aspect of the invention, the selection circuit may select the second processing circuit; the second processing circuit may generate the interpolation pixel data corresponding to an interpolation position located between adjacent pixel positions; and the computation circuit may perform computation by using the interpolation pixel data corresponding to interpolation positions located at two ends on a diagonal passing through an interpolation position corresponding to new interpolation pixel data so as to generate blur pixel data.

Preferably, in the image processing apparatus according to the first aspect of the invention, when a plurality of types of blocks, which are used as a unit for generating a motion vector, are defined, and when the motion vector is generated by designating the type of block in the predetermined image data as the unit, the selection circuit may select, in a first operation mode, the first processing circuit when the designated type of block has a predetermined size or greater, and may select the second processing circuit when the designated type of block has a size smaller than the predetermined size, and the selection circuit may select, in a second operation mode, the second processing circuit regardless of the designated type of block, and the selection circuit may make the selection so that the interpolation pixel data used for generating the blur pixel data is generated by the second processing circuit regardless of the first operation mode or the second operation mode.

Preferably, in the image processing apparatus according to the first aspect of the invention, in a first operation mode, the computation circuit may perform computation by using the pixel data corresponding to positions around an interpolation position of the blur pixel data so as to generate blur pixel data. In a second operation mode, the computation circuit may perform computation by using the interpolation pixel data corresponding to interpolation positions located at two ends on a diagonal passing through an interpolation position corresponding to new interpolation pixel data so as to generate blur pixel data.

According to a second aspect of the present invention, there is provided an image processing apparatus including: a storage circuit for storing first image data therein; a motion-vector generating circuit for generating a motion vector of predetermined image data by using second image data obtained by interpolating pixel data of the first image data read from the storage circuit; and an image processing circuit for generating the interpolated pixel data forming the second image data by interpolating the pixel data of the first image data. The image processing circuit includes: a first processing circuit for generating interpolation pixel data forming the second image data by using pixel data for a first number of pixels of the first pixel data; a second processing circuit for generating the interpolation pixel data forming the second image data by using pixel data for a second number of pixels, which is smaller than the first number of pixels of the first image data; and a selection circuit for selecting one of the first processing circuit and the second processing circuit to generate the interpolation pixel data according to a motion compensation mode.

According to a third aspect of the present invention, there is provided an image processing apparatus for generating second image data based on a motion vector and first image data read from a storage circuit. The image processing apparatus includes: a first processing circuit for generating interpolation pixel data forming third image data by using pixel data for a first number of pixels of the first image data; a second processing circuit for generating the interpolation pixel data forming the third image data by using pixel data for a second number of pixels, which is smaller than the first number of pixels of the first image data; a selection circuit for selecting one of the first processing circuit and the second processing circuit to generate the interpolation pixel data according to a motion compensation mode; and an image generating circuit for generating the second image data based on the third image data and the motion vector.

Preferably, the image processing apparatus according to the third aspect of the invention may further include: the storage circuit for storing the first image data therein; a decoding circuit for generating the first image data by decoding predetermined image data; and a computation circuit for performing computation by using the first image data and the third image data so as to generate fourth image data.

According to a fourth aspect of the present invention, there is provided an image processing method for generating pixel data forming second image data by interpolating pixel data of first image data read from a storage circuit when generating a motion vector of predetermined image data by using the second image data. The image processing method includes the steps of: selecting, according to a motion compensation mode, one of first processing for generating interpolation pixel data forming the second image data by using pixel data for a first number of pixels of the first image data, and second processing for generating interpolation pixel data forming the second image data by using pixel data for a second number of pixels, which is smaller than the first number of pixels of the first image data; and generating the interpolation pixel data by executing the selected first or second processing.

According to a fifth aspect of the present invention, there is provided an image processing method for generating second image data based on a motion vector and first image data read from a storage circuit. The image processing method includes the steps of: selecting, according to a motion compensation mode, one of first processing for generating interpolation pixel data forming third image data by using pixel data for a first number of pixels of the first image data, and second processing for generating the interpolation pixel data forming the third image data by using pixel data for a second number of pixels, which is smaller than the first number of pixels of the first image data; generating the interpolation pixel data by executing the selected first or second processing; and generating the second image data based on the third image data and the motion vector.

According to a sixth aspect of the present invention, there is provided an image processing apparatus for generating pixel data forming second image data by interpolating pixel data of first image data read from a first storage circuit when generating a motion vector of predetermined image data by using the second image data. The image processing apparatus includes: the first storage circuit; a first processing circuit for generating first interpolation pixel data forming the second image data by using pixel data for a first number of pixels of the first image data; a second storage circuit for storing the first interpolation pixel data therein; a second processing circuit for generating second interpolation pixel data forming the second image data by using pixel data for a second number of pixels, which is smaller than the first number of pixels of the first image data; a third storage circuit for storing the second interpolation pixel data therein; and a selection circuit for selecting, according to a motion compensation mode, one of the first interpolation pixel data stored in the second storage circuit and the second interpolation pixel data stored in the third storage circuit as the pixel data forming the second image data used for generating the motion vector.

According to a seventh aspect of the present invention, there is provided an image processing method for generating pixel data forming second image data by interpolating pixel data of first image data read from a first storage circuit when generating a motion vector of predetermined image data by using the second image data. The image processing method includes the steps of: generating first interpolation pixel data forming the second image data by using pixel data for a first number of pixels of the first image data, and storing the first interpolation pixel data in a second storage circuit; generating second interpolation pixel data forming the second image data by using pixel data for a second number of pixels, which is smaller than the first number of pixels of the first image data, and storing the second interpolation pixel data in a third storage circuit; and selecting, according to a motion compensation mode, one of the first interpolation pixel data stored in the second storage circuit and the second interpolation pixel data stored in the third storage circuit as the pixel data forming the second image data used for generating the motion vector.

According to an eighth aspect of the present invention, there is provided an image processing apparatus for generating a motion vector of predetermined image data and predictive image data by using second image data obtained by interpolating pixel data of first image data read from a first storage circuit. The image processing apparatus includes: the first storage circuit; a first processing circuit for generating first interpolation pixel data forming the second image data by using pixel data for a first number of pixels of the first image data; a second storage circuit for storing the first interpolation pixel data therein; a motion-vector generating circuit for generating the motion vector by using the predetermined image data, the first image data, and the first interpolation pixel data; a second processing circuit for generating second interpolation pixel data forming the second image data by using pixel data for a second number of pixels, which is smaller than the first number of pixels of the first image data; and a predictive-image generating circuit for selecting, according to a motion compensation mode, one of first processing for generating the predictive image data by using the first image data read from the first storage circuit, the first interpolation pixel data read from the second storage circuit, and the motion vector, and second processing for generating the predictive image data by using the first image data read from the first storage circuit, the second interpolation pixel data generated by the second processing circuit, and the motion vector.

According to a ninth aspect of the present invention, there is provided an image processing method for generating a motion vector of predetermined image data and predictive image data by using second image data obtained by interpolating pixel data of first image data read from a first storage circuit. The image processing method includes the steps of: generating first interpolation pixel data forming the second image data by using pixel data for a first number of pixels of the first image data, and storing the first interpolation pixel data in a second storage circuit; generating the motion vector by using the predetermined image data, the first image data, and the first interpolation pixel data; generating second interpolation pixel data forming the second image data by using pixel data for a second number of pixels, which is smaller than the first number of pixels of the first image data; and selecting, according to a motion compensation mode, one of first processing for generating the predictive image data by using the first image data read from the first storage circuit, the first interpolation pixel data read from the second storage circuit, and the motion vector, and second processing for generating the predictive image data by using the first image data read from the first storage circuit, the second interpolation pixel data, and the motion vector.

As described above, according to the present invention, it is possible to provide a smaller, less expensive, lower-power image processing apparatus that can perform motion prediction/compensation with high pixel precision, and also to provide a method for use in such an image processing apparatus.

DESCRIPTION OF THE PREFERRED EMBODIMENTS

The present invention is described in detail below with reference to the accompanying drawings through illustration of preferred embodiments.

First Embodiment

Figure 5:
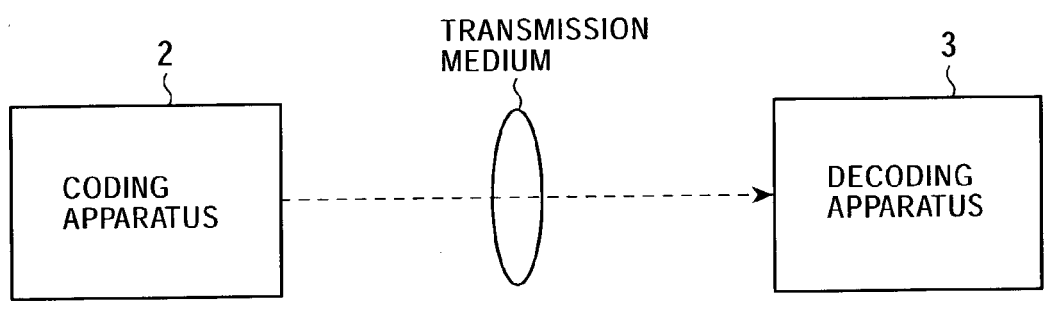
FIG. 5 is a schematic diagram illustrating a communication system according to a first embodiment of the present invention.

FIG. 5 is a schematic diagram illustrating a communication system 1 according to a first embodiment of the present invention. The communication system 1 includes, as shown in FIG. 5, a coding apparatus 2 disposed at a transmitter, and a decoding apparatus 3 disposed at a receiver.

In the coding apparatus 2, an image signal (bit stream) compressed by orthogonal transform, such as DCT or Karhunen-Loeve transform, and motion compensation, is generated. After being modulated, the image signal is transmitted via a transmission medium, such as a satellite broadcast wave, a cable television network, a telephone line network, or a cellular telephone line network.

In the receiver, the received image signal is demodulated, and is decompressed by performing inverse orthogonal transform and motion compensation, which correspond to the orthogonal transform and motion compensation performed when the signal is modulated.

The above-described transmission medium may be a recording medium, such as an optical disc, a magnetic disk, or a semiconductor memory.

In the first embodiment, motion prediction/compensation is performed with 1/4 pixel precision in the coding apparatus 2 and the decoding apparatus 3.

It should be noted that the coding apparatus 2 corresponds to image processing apparatuses according to the first and second aspects of the invention.

Figure 6:
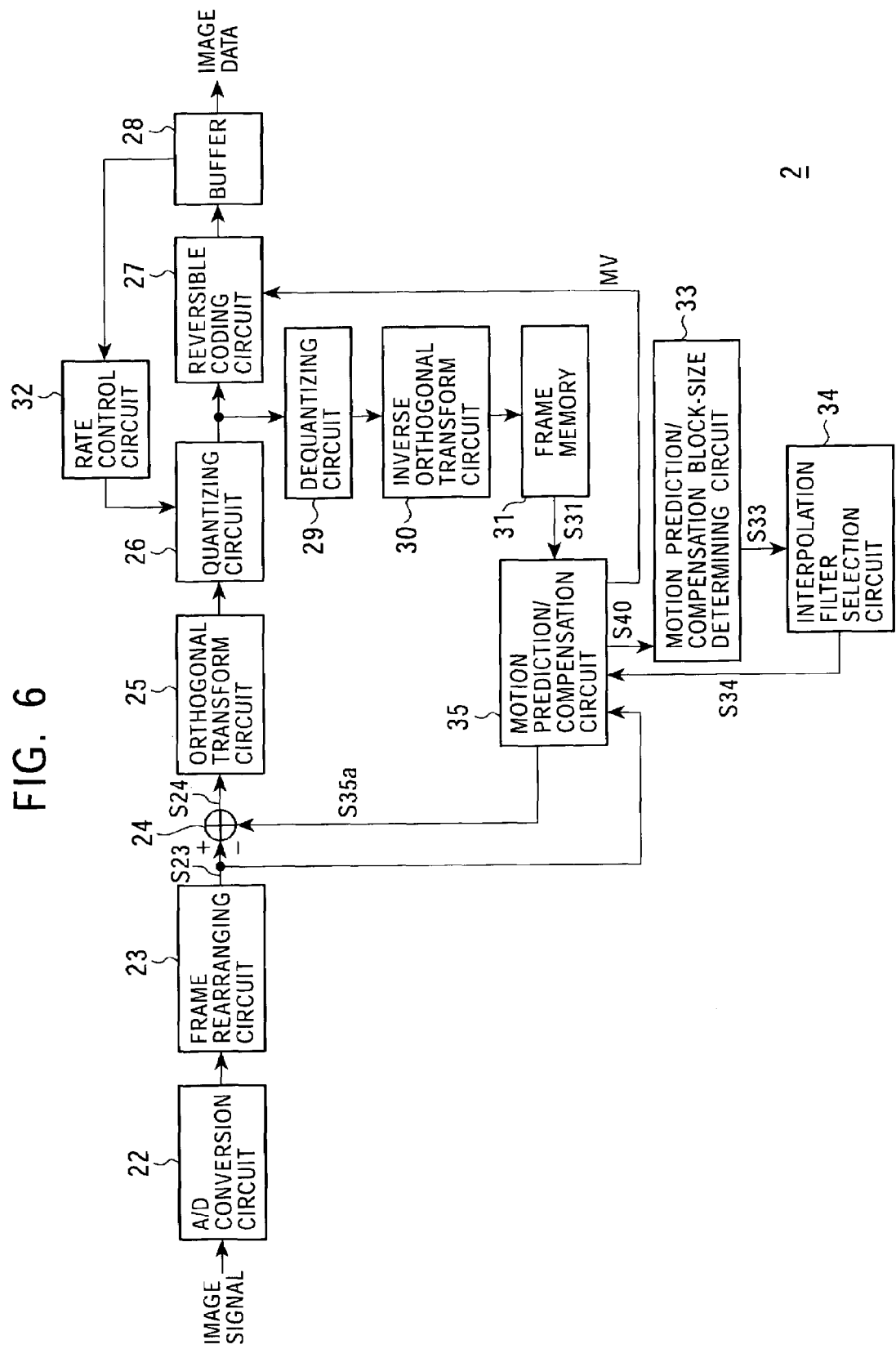
FIG. 6 is a functional block diagram illustrating a coding apparatus shown in FIG. 5.

FIG. 6 is a block diagram illustrating the coding apparatus 2 shown in FIG. 5. The coding apparatus 2 includes, as shown in FIG. 6, an A/D conversion circuit 22, a frame rearranging circuit 23, a computation circuit 24, an orthogonal transform circuit 25, a quantizing circuit 26, a reversible coding circuit 27, a buffer 28, a dequantizing circuit 29, an inverse orthogonal transform circuit 30, a frame memory 31, a rate control circuit 32, a motion prediction/compensation block-size determining circuit 33, an interpolation filter selection circuit 34, and a motion prediction/compensation circuit 35. It should be noted that the frame memory 31 corresponds to the storage circuit of the present invention.

In the coding apparatus 2, the interpolation filter selection circuit 34 generates a filter selection signal based on a determination signal from the motion prediction/compensation block-size determining circuit 33, and the motion prediction/compensation circuit 35 selects the filter circuit used for motion prediction/compensation based on the filter selection signal.

Details of the elements of the coding apparatus 2 are given below.

The A/D conversion circuit 22 converts an analog image signal consisting of a luminance signal component Y and chrominance signal components Pb and Pr into a digital image signal, and outputs it to the frame rearranging circuit 23.

The frame rearranging circuit 23 rearranges the frame image signals of the image signal received from the A/D conversion circuit 22 in the order in which they are coded according to the GOP structure consisting of picture types I, P, and B, and outputs the rearranged image signal S23 to the computation circuit 24 and the motion prediction/compensation circuit 35.

If the frame image signal of the image signal S23 is to be inter-coded, the computation circuit 24 generates a signal S24 indicating the difference between the frame image signal and a predictive image signal S35a received from the motion prediction/compensation circuit 35, and outputs the signal S24 to the orthogonal transform circuit 25.

If the frame image signal of the image signal S23 is to be intra-coded, the computation circuit 24 outputs the frame image signal to the orthogonal transform circuit 25 as the signal S24.

The orthogonal transform circuit 25 performs orthogonal transform, such as DCT or Karhunen-Loeve transform, on the signal S24 so as to generate an image signal (for example, a DCT coefficient signal) S25, and outputs it to the quantizing circuit 26.

The quantizing circuit 26 quantizes the image signal S25 according to a quantizing scale input from the rate control circuit 32 so as to generate data S26, and outputs it to the reversible coding circuit 27 and the dequantizing circuit 29.

The reversible coding circuit 27 performs reversible coding, such as variable-length coding or arithmetic coding, on the data S26, and stores the resulting data S26 in the buffer 28.

Simultaneously, the reversible coding circuit 27 also codes the motion vector MV input from the motion prediction/compensation circuit 35, and stores the motion vector MV in header data, such as a slice header.

The reversible coding circuit 27 may also store filter selection information obtained by the processing, which is described below, of the motion prediction/compensation circuit 35, in the header data.

The signal stored in the buffer 28 is modulated and is then transmitted.

The dequantizing circuit 29 dequantizes the data S26, and outputs the dequantized data to the inverse orthogonal transform circuit 30.

The inverse orthogonal transform circuit 30 performs inverse orthogonal transform, which corresponds to the orthogonal transform performed in the orthogonal transform circuit 25, on the signal input from the dequantizing circuit 29 so as to generate a frame image signal (reference image signal corresponding to the first image data of the present invention), and stores it in the frame memory 31.

The rate control circuit 32 generates a quantizing scale based on the data read from the buffer 28, and outputs it to the quantizing circuit 26.

The motion prediction/compensation block-size determining circuit 33 determines the mode (type) of the MC block, which is the unit for performing motion prediction/compensation in the motion prediction/compensation circuit 35, based on the signal from the motion prediction/compensation circuit 35, and outputs a determined mode to the interpolation filter selection circuit 34.

The interpolation filter selection circuit 34 selects the filter circuit used for interpolating pixel data in the motion prediction/compensation circuit 35 based on the determined mode input from the motion prediction/compensation block-size determining circuit 33, and outputs a filter selection signal S34 indicating the selection result to the motion prediction/compensation circuit 35.

The motion prediction/compensation circuit 35 receives the image signal S23 and the reference image signal S31 corresponding to the picture type of the image signal S23, and generates a motion vector MV of the frame image corresponding to the image signal S23 by using an image signal generated by performing 1/4-pixel interpolation on the reference image signal S31 and by using the MC block of the designated mode (type) as the unit.

The motion prediction/compensation circuit 35 generates a motion-compensated predictive image signal S35a having 1/4 pixel precision from the motion vector MV and the reference image signal S31, and outputs the predictive image signal S35a to the computation circuit 24.

Figure 7:
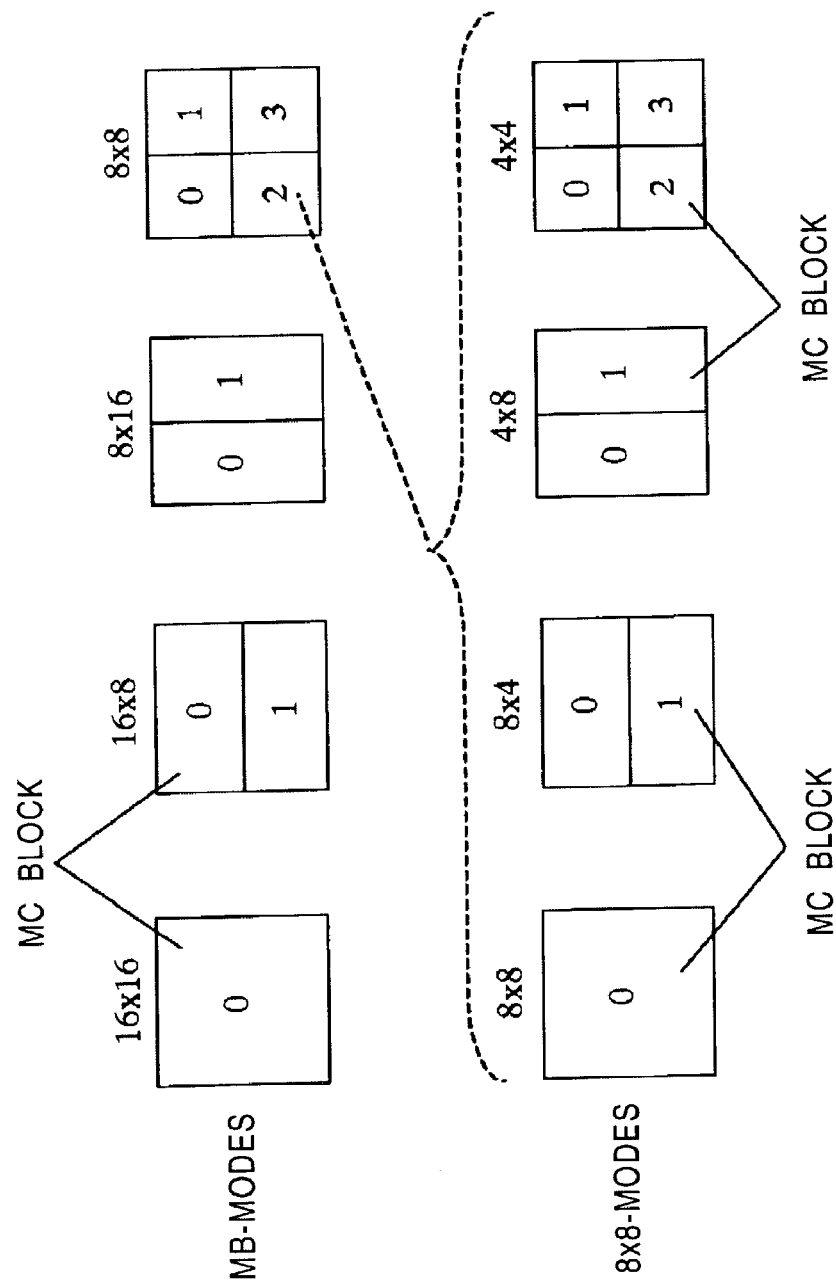
FIG. 7 illustrates motion compensation (MC) blocks.

FIG. 7 illustrates the types of MC blocks. The MC block is defined, as shown in FIG. 7, based on a 16×16 macroblock.

There are four types (modes) of MC blocks: a 16×16 mode in which the macroblock itself is used as the MC block; a 16×8 mode in which the macroblock is divided into two 16×8 blocks; a 8×16 mode in which the macroblock is divided into two 8×16 blocks; and a 8×8 mode in which the macroblock is divided into four 8×8 blocks.

There are also four types of 8×8-mode MC blocks: a 8×8 mode in which the 8×8-mode MC block itself is used as the MC block; a 8×4 mode in which the MC block is divided into two 8×4 blocks; a 4×8 mode in which the MC block is divided into two 4×8 blocks; and a 4×4 block in which the MC block is divided into four 4×4 blocks. A desired mode can be selected from the four 8×8-mode MC blocks.

Figure 8:
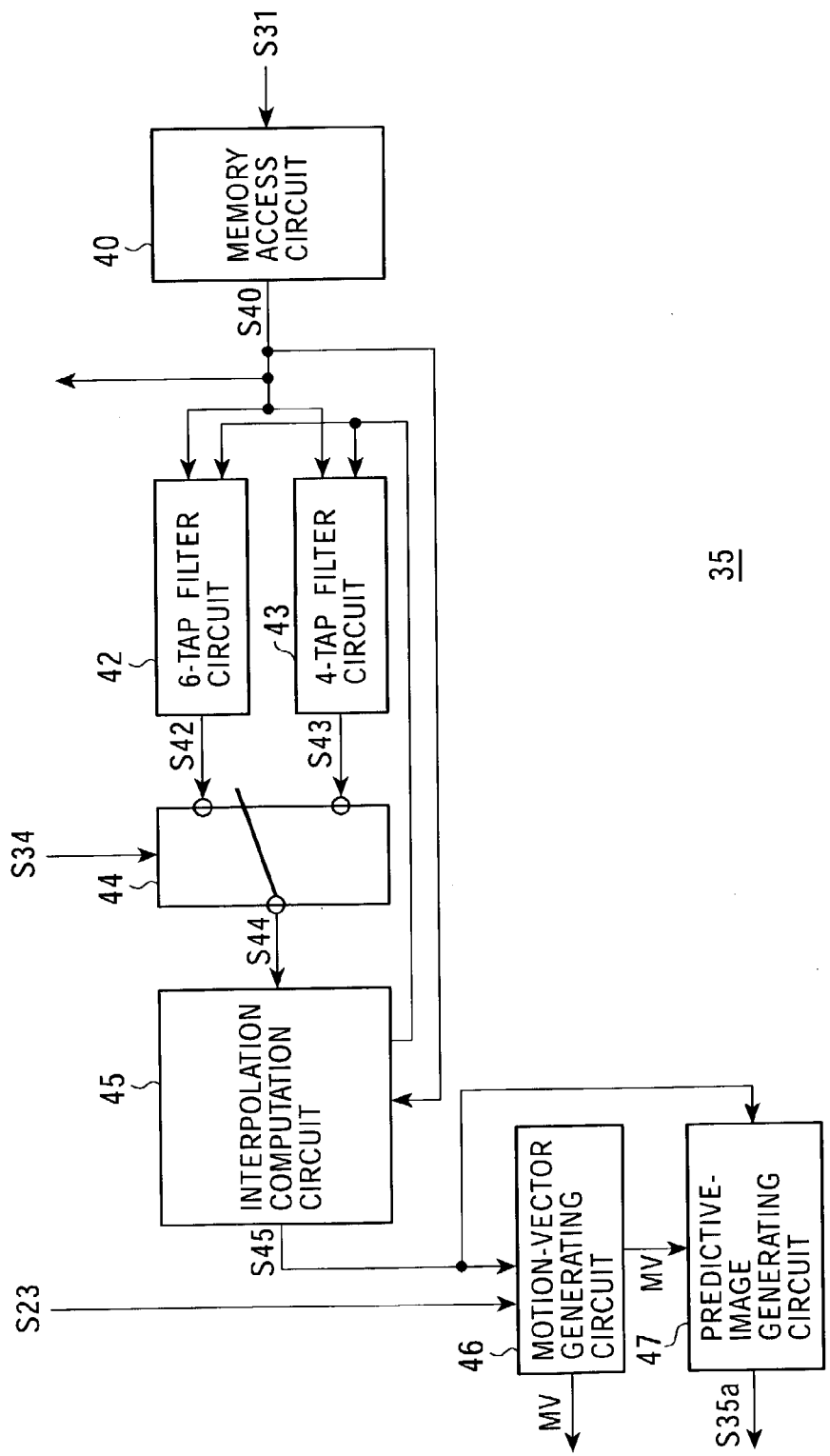
FIG. 8 is a functional block diagram illustrating a motion prediction/compensation circuit shown in FIG. 6.

FIG. 8 is a functional block diagram illustrating the motion prediction/compensation circuit 35 shown in FIG. 6.

The motion prediction/compensation circuit 35 includes, as shown in FIG. 8, a memory access circuit 40, a 6-tap filter circuit 42, a 4-tap filter circuit 43, a selection circuit 44, an interpolation computation circuit 45, a motion-vector generating circuit 46, and a predictive-image generating circuit 47.

The 6-tap filter circuit 42 corresponds to a first filter circuit of the present invention, the 4-tap filter circuit 43 corresponds to a second filter circuit of the present invention, and the selection circuit 44 corresponds to the selection circuit of the present invention.

The memory access circuit 40 reads the image signal S31, which serves as a reference image signal for the image signal S23 (the first image data of the present invention), from the frame memory 31 with a predetermined timing, and outputs the image signal S31 to the 6-tap filter circuit 42, the 4-tap filter circuit 43, the motion prediction/compensation block-size determining circuit 33, and the interpolation computation circuit 45 as the image signal S40.

The 6-tap filter circuit 42 is a FIR filter. By using 6 integer-precision pixel signals contained in the image signal S40 or interpolation pixel signals at 6 interpolation pixel positions (phase) (pixel data having the first pixel number of the present invention) input from the interpolation computation circuit 45, the 6-tap filter circuit 42 generates an image signal S42 containing interpolation pixel signals, which is pixel data at interpolation pixel positions located between the 6 pixel positions or the 6 interpolation pixel positions, and outputs the image signal S42 to the selection circuit 44.

Figure 9:
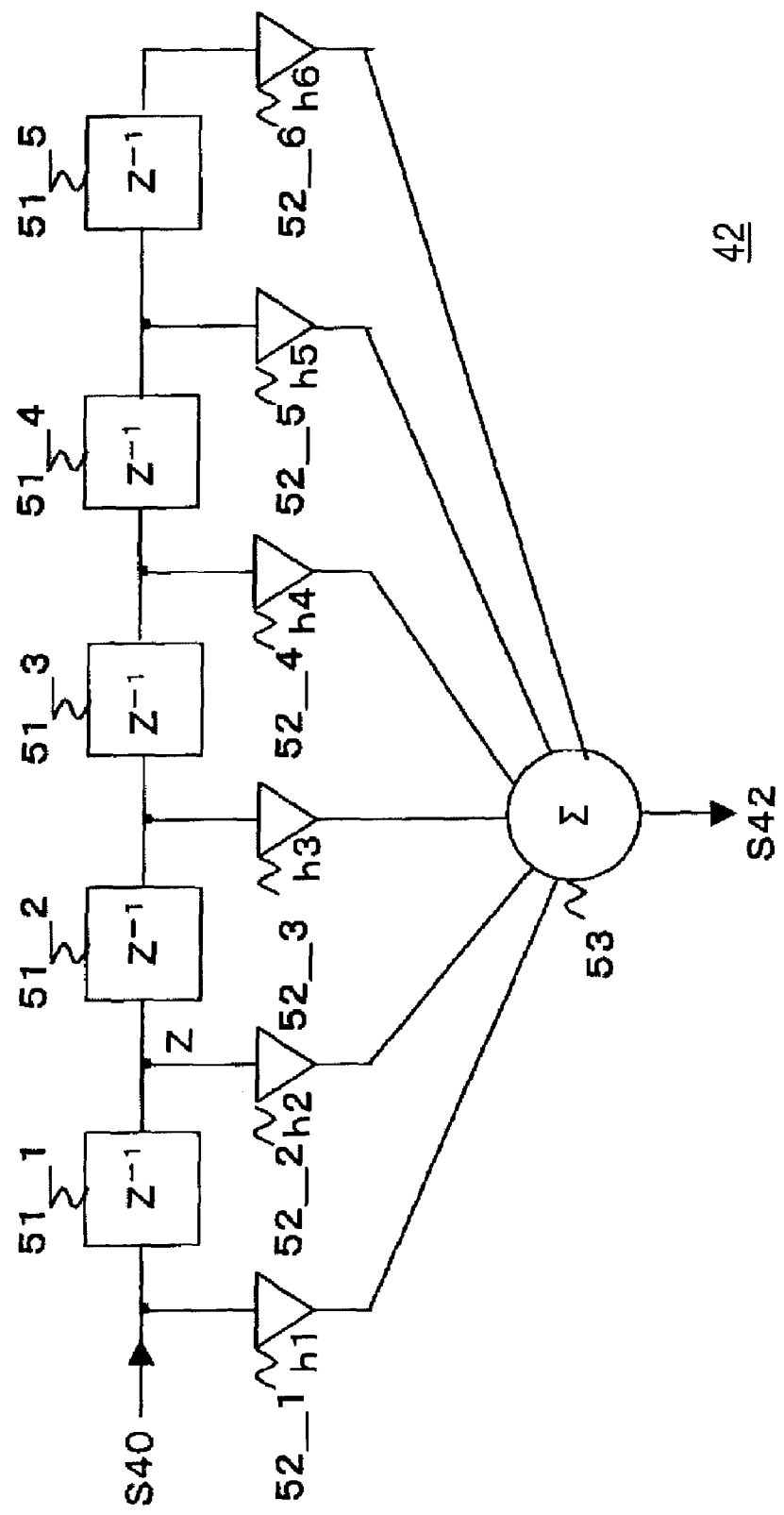
FIG. 9 is a schematic diagram illustrating a 6-tap filter circuit 42 shown in FIG. 8.

FIG. 9 illustrates the configuration of the 6-tap filter circuit 42. The 6-tap filter circuit 42 includes, as shown in FIG. 9, delay circuits 51_1 through 51_5, coefficient multiplication circuits 52_1 through 52_6, and an addition circuit 53.

The delay circuits 51_1 through 51_5 are connected in series with each other, and pixel signals contained in the image signal S40 input into the delay circuit 51_1 are sequentially delayed in the delay circuits 51_1 through 51_5 by a predetermined time (time intervals of continuous pixel signals contained in the image signal S40), and are transmitted toward the delay circuit 51_5.

The coefficient multiplication circuit 52_1 generates a pixel signal obtained by multiplying the pixel signal in the image signal S40 by coefficient h1, and outputs it to the addition circuit 53.

The coefficient multiplication circuits 52_2 through 52_6 respectively generate pixel signals obtained by multiplying the pixel signals output from the delay circuit 51_1 through 51_5 by coefficients h2 through h6, respectively, and outputs them to the addition circuit 53.

The addition circuit 53 generates an interpolation pixel signal by adding the pixel signals input from the coefficient multiplication circuits 52_1 through 52_6, and outputs the interpolation pixel signal to the selection circuit 44 as the image signal S42.

In this embodiment, as the above-described coefficients {h1, h2, h3, h4, h5, h6}, {1, −5, 20, 20, −5, 1}, for example, are used.

The 4-tap filter circuit 43 is a FIR filter. By using 4 pixel signals contained in the image signal S40 or interpolation pixel signals at 4 interpolation pixel positions (pixel data having the second pixel number of the present invention) input from the interpolation computation circuit 45, the 4-tap filter circuit 43 generates an image signal S43 containing an interpolation pixel signal, which is pixel data at interpolation pixel positions located between the 4 pixel positions or the 4 interpolation pixel positions, and outputs the image signal S43 to the selection circuit 44.

Figure 10:
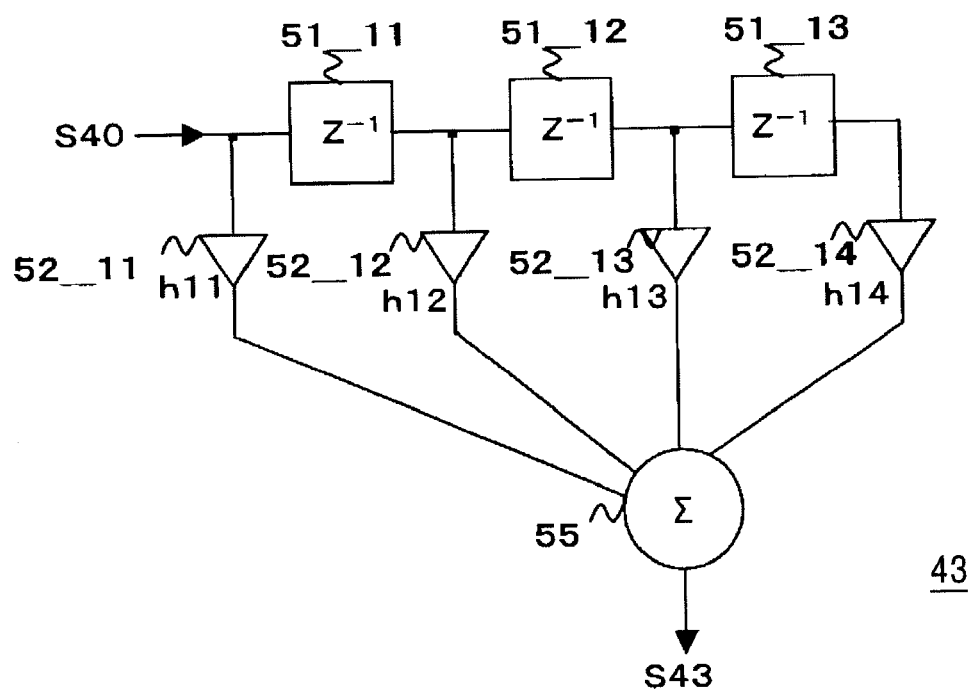
FIG. 10 is a schematic diagram illustrating a 4-tap filter circuit 43 shown in FIG. 8.

FIG. 10 illustrates the configuration of the 4-tap filter circuit 43. The 4-tap filter circuit 43 includes, as shown in FIG. 10, delay circuits 51_11 through 51_13, coefficient multiplication circuits 52_11 through 52_14, and an addition circuit 55.

The delay circuits 51_11 through 51_13 are connected in series with each other, and pixel signals contained in the image signal S40 input into the delay circuit 51_11 are sequentially delayed in the delay circuits 51_11 through 51_13 by a predetermined time (time intervals of continuous pixel signals in the image signal S40), and are transmitted toward the delay circuit 51_13.

The coefficient multiplication circuit 52_11 generates a pixel signal obtained by multiplying the pixel signal in the image signal S40 by a coefficient h11, and outputs the resulting pixel signal to the addition circuit 55.

The coefficient multiplication circuits 52_12 through 52_14 respectively generate pixel signals obtained by multiplying the pixel signals output from the delay circuits 51_11 through 51_13 by coefficients h12 through h14, respectively, and outputs the resulting pixel signals to the addition circuit 55.

The addition circuit 55 generates an interpolation pixel signal by adding the pixel signals output from the coefficient multiplication circuits 52_11 through 52_14, and outputs the interpolation pixel signal to the selection circuit 44 as the image signal S43.

In this embodiment, as the above-described coefficients {h11, h12, h13, h14}, {−1, 5, 5, −1}, for example, are used.

As described below, the selection circuit 44 selects one of the 6-tap filter circuit 42 and the 4-tap filter circuit 43 based on the filter selection signal S34, which is determined according to the MC block mode (see FIG. 7), input from the interpolation filter selection circuit 34.

When the filter selection signal S34 input from the interpolation filter selection circuit 34 shown in FIG. 6 indicates that the 6-tap filter circuit 42 is to be selected, the selection circuit 44 selects the image signal S42, and outputs it to the interpolation computation circuit 45 as an image signal S44.

When the filter selection signal S34 indicates that the 4-tap filter circuit 43 is to be selected, the selection circuit 44 selects the image signal S43, and outputs it to the interpolation computation circuit 45 as the image signal S44.

In this embodiment, memory access or computation is not performed on the filter circuit that is not selected by the selection circuit 44.

The selection circuit 44 may be disposed before the 6-tap filter circuit 42 and the 4-tap filter circuit 43.

In this embodiment, if the MC block mode is 16×16, 16×8, or 8×16, the selection circuit 44 selects the image signal S42 based on the filter selection signal S34. Then, the 6-tap filter circuit 42 outputs the image signal S44 containing an interpolation pixel signal at an interpolation position b1 located at the middle position between pixel A2 and pixel A4 shown in FIG. 11 and an interpolation pixel signal at an interpolation position b2 located at the middle position between pixel A3 and pixel A4 shown in FIG. 11 to the interpolation computation circuit 45. The interpolation pixel signal at interpolation position b1 has been generated by using 6 pixel signals in the direction orthogonal to the lines containing the pixel A2 and pixel A4. The interpolation signal at interpolation position b2 has been generated by using 6 pixel signals in the direction orthogonal to the lines containing pixel A3 and pixel A4.

If the MC block mode is 8×8, the selection circuit 44 selects the image signal S43 based on the filter selection signal S34. Then, the 4-tap filter circuit 43 outputs the image signal S44 containing an interpolation pixel signal at interpolation position b1 located at the middle position located between pixel A2 and pixel A4 shown in FIG. 12, and an interpolation pixel signal at interpolation position b2 located at the middle position between pixel A3 and pixel A4 shown in FIG. 12 to the interpolation computation circuit 45. The interpolation pixel signal at interpolation position b1 has been generated by using 4 pixel signals in the direction orthogonal to the lines containing pixel A2 and pixel A4. The interpolation pixel signal at interpolation position b2 has been generated by using 4 pixel signals in the direction orthogonal to the lines containing pixel A3 and A4.

Figure 11:
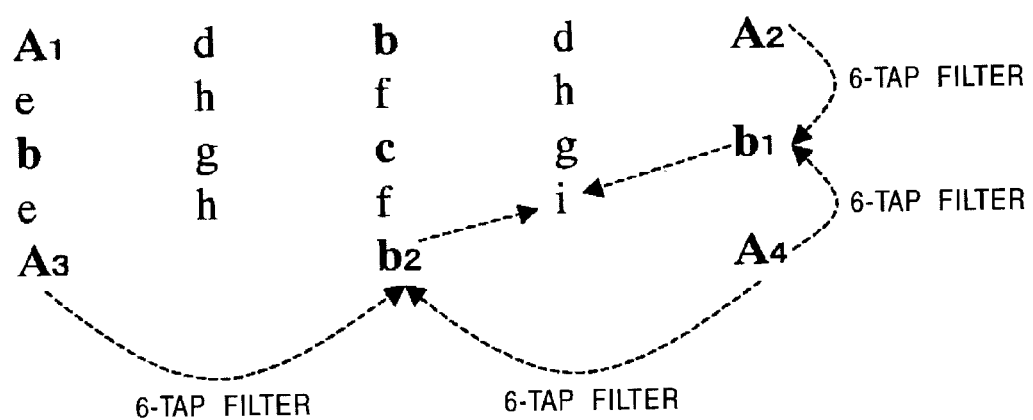
FIG. 11 illustrates a method for generating interpolation pixel signals in a 16×16, 16×8, or 8×16 mode.
Figure 12:
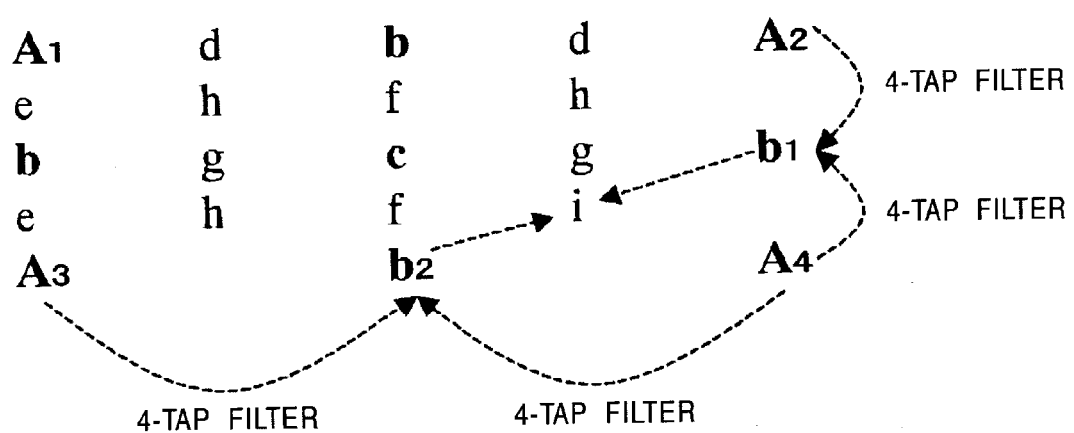
FIG. 12 illustrates a method for generating interpolation pixel signals in an 8×8 mode.

The interpolation computation circuit 45 generates interpolation pixel signals at interpolation positions c, d, e, f, g, h, and i shown in FIGS. 11 and 12 by using the pixel signals in the image signal S40 input from the memory access circuit 40 and the interpolation pixel signals in the image signal S44 input from the selection circuit 44. Then, the interpolation computation circuit 45 generates an image signal S45 (the second image data of the present invention), having 1/4 pixel precision, i.e., the image signal S45 having the number of pixels four times greater than that of the image signal S40, consisting of the above-described interpolation pixel signals and the pixel signals contained in the image signal S40. The interpolation computation circuit 45 outputs the image signal S45 to the motion-vector generating circuit 46 and the predictive-image generating circuit 47.

More specifically, for example, when generating an interpolation pixel signal at interpolation position c shown in FIGS. 11 and 12, the interpolation pixel signal having 1/2 pixel precision at interpolation position b in the image signal S44 is clipped with a range [0, 255], and is then output to the 6-tap filter circuit 42 and the 4-tap filter circuit 43. Similarly, the interpolation image signal input from the selection circuit 44 is clipped with a range [0, 255], and is used as an interpolation pixel signal S(c) at interpolation position c.

The interpolation computation circuit 45 generates interpolation pixel signals S(d), S(g), S(e), S(f), and S(i) at interpolation positions d, g, e, f, and i, respectively, based on the following equations (1), (2), (3), (4), and (5), respectively, by using integer-precision pixel signals S(A) of pixels A located near the interpolation positions d, g, e, f, and i and also by using interpolation pixel signals S(b) at interpolation positions b.

$$S(d)=(S(A)+S(b))/2 \quad (1)$$

$$S(g)=(S(b)+S(c))/2 \quad (2)$$

$$S(e)=(S(A)+S(b))/2 \quad (3)$$

$$S(f)=(S(b)+S(c))/2 \quad (4)$$

$$S(i)=(S(A1)+S(A2)+S(A3)+S(A4))/4 \quad (5)$$

The interpolation pixel signal S(i) may be generated according to another method, as described in an embodiment described below.

The motion-vector generating circuit 46 generates motion vector MV based on the designated mode of the MC block by using the image signal S23 of the target image (the predetermined image data of the present invention) and the image signal S45 (the second image data of the present invention) having 1/4 pixel precision generated from the reference image signal S31. The motion-vector generating circuit 46 then outputs the generated motion vector MV to the predictive-image generating circuit 47 and the reversible coding circuit 27.

The predictive-image generating circuit 47 generates the predictive image signal S35a with 1/4 pixel precision by using the motion vector MV and the image signal S45 corresponding to the reference image, and outputs the predictive image signal S35a to the computation circuit 24.

An example of the operation of the motion prediction/compensation circuit 35 shown in FIG. 8 is given below.

The memory access circuit 40 reads the image signal S31, which serves as a reference image signal of the image signal S23, with a predetermined timing from the frame memory 31 as the image signal S40. The memory access circuit 40 then outputs the image signal S40 to the 6-tap filter circuit 42, the 4-tap filter circuit 43, the motion prediction/compensation block-size determining circuit 33, and the interpolation computation circuit 45.

The 6-tap filter circuit 42 and the 4-tap filter circuit 43 generate the image signal S42 and the image signal S43, respectively, containing the interpolation pixel signals, and output them to the selection circuit 44.

If the MC block mode is 16×16, 16×8, or 8×16, the selection circuit 44 selects the image signal S42 based on the filter selection signal S34, and outputs it to the interpolation computation circuit 45 as the image signal S44. If the MC block mode is 8×8, the selection circuit 44 selects the image signal S43 based on the filter selection signal S34, and outputs it to the interpolation computation circuit 45 as the image signal S44.

The interpolation computation circuit 45 then generates the interpolation pixel signals having 1/4 pixel precision at the interpolation positions shown in FIGS. 11 and 12 by using the pixel signals contained in the image signal S40 input from the memory access circuit 40 and the interpolation pixel signals contained in the image signal S44 input from the selection circuit 44. The image signal S45 having 1/4 pixel precision is then output to the motion-vector generating circuit 46.

The motion-vector generating circuit 46 then generates motion vector MV based on the designated mode of the MC block by using the image signal S23 of the target image and the image signal S45 having 1/4 pixel precision generated from the reference image signal S31. The generated motion vector MV is then output to the predictive-image generating circuit 47 and the reversible coding circuit 27.

Subsequently, the predictive-image generating circuit 47 generates the predictive image signal S35a with 1/4 pixel precision by using the motion vector MV and the image signal S45 corresponding to the reference image, and outputs the predictive image signal S35a to the computation circuit 24.

Based on the image signal S40 input from the memory access circuit 40 of the motion prediction/compensation circuit 35 shown in FIG. 8, the motion prediction/compensation block-size determining circuit 33 shown in FIG. 6 determines the MC block mode of the image to be generated in the motion-vector generating circuit 46 from the modes shown in FIG. 7, and outputs an MC-mode determination signal S33 indicating the designated mode to the interpolation filter selection circuit 34.

If the MC-mode determination signal S33 indicates the 16×16, 16×8, or 8×16 mode, the interpolation filter selection circuit 34 outputs the filter selection signal S34 indicating that the 6-tap filter circuit 42 is to be selected to the motion prediction/compensation circuit 35.

If the MC-mode determination signal S33 indicates 8×8, the interpolation filter selection circuit 34 outputs the filter selection signal S34 indicating that the 4-tap filter circuit 43 is to be selected to the motion prediction/compensation circuit 35.

The overall operation of the coding apparatus 2 shown in FIG. 6 is described below.

An input image signal is first converted into a digital signal in the A/D conversion circuit 22. The frames of the digital signal are then rearranged in the frame rearranging circuit 23 according to the GOP structure of the image compression information.

For pictures to undergo intra-coding, image information of the overall frame is input into orthogonal transform circuit 25, and undergoes orthogonal transform, such as DCT or Karhunen-Loeve transform.

A transform coefficient output from the orthogonal transform circuit 25 is quantized in a quantizing circuit 26.

The quantized transform coefficient output from the quantizing circuit 26 is input into the reversible transform circuit 27, and undergoes reversible coding, such as variable-length coding or arithmetic coding. Then, the resulting transform coefficient is stored in the buffer 28, and is output as compressed image data.

The quantizing rate employed in the quantizing circuit 26 is controlled by the rate control circuit 32. Meanwhile, the quantized transform coefficient output from the quantizing circuit 26 is also input into the dequantizing circuit 29, and further undergoes inverse orthogonal transform in the inverse orthogonal transform circuit 30, resulting in a decoded image signal. The decoded image signal is stored in the frame memory 31.

For pictures to undergo inter-coding, the corresponding image signal is input into the motion prediction/compensation circuit 35. Simultaneously, the reference image signal S31 is read from the frame memory 31, and undergoes motion prediction/compensation in the motion prediction/compensation circuit 35 by using the filter circuit selected based on the filter selection signal S34, thereby generating the predictive image signal S35a. The predictive image signal S35a is output to the computation circuit 24, and the image signal S24, which indicates the difference between the image signal S23 output from the frame rearranging circuit 23 and the predictive image signal S35a output from the motion prediction/compensation circuit 35, is generated, and is output to the orthogonal transform circuit 25.

The motion prediction/compensation circuit 35 outputs a motion vector MV by using the filter circuit selected based on the filter selection signal S34, and outputs the motion vector MV to the reversible coding circuit 27. The motion vector MV undergoes reversible coding, such as variable-length coding or arithmetic coding, in the reversible coding circuit 27, and is inserted into the header of the image signal. The rest of the processing is similar to that of intra-coding.

As described above, according to the coding apparatus 2, when motion prediction/compensation is performed in the motion prediction/compensation circuit 35 by using the 16×16, 16×8, or 8×16-mode MC block, the interpolation pixel signal is generated by using the 6-tap filter circuit 42. When motion prediction/compensation processing is performed by using the 8×8-mode MC block, the interpolation pixel signal is generated by using the 4-tap filter circuit 43.

Accordingly, unlike the related art in which an interpolation pixel signal is generated by a 6-tap filter circuit when the 8×8-mode MC block is used, the load on the motion prediction/compensation circuit 35 can be decreased, thereby making it possible to reduce the size of the motion prediction/compensation circuit 35.

More specifically, by using the 4-tap filter circuit 43 in the 8×8 mode that imposes a heavier access load (overhead) on the frame memory 31, the maximum load on the frame memory 31 can be decreased. Accordingly, the frame memory 31 can be made smaller and less expensive, and also, the memory band can be decreased compared to that of the related art. The power consumption of the frame memory 31 can also be reduced.

Figure 3:
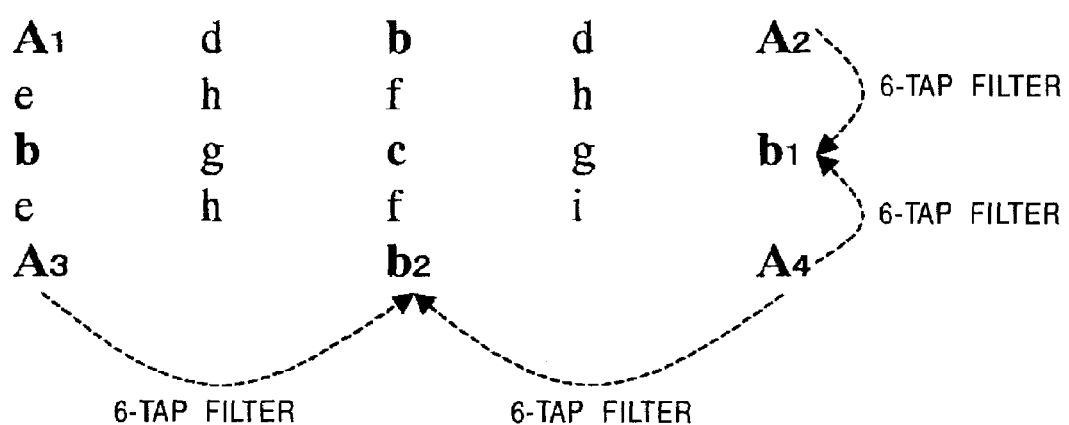
FIG. 3 illustrates an image signal having 1/4 pixel precision used in a known coding or decoding apparatus.
Figure 4:
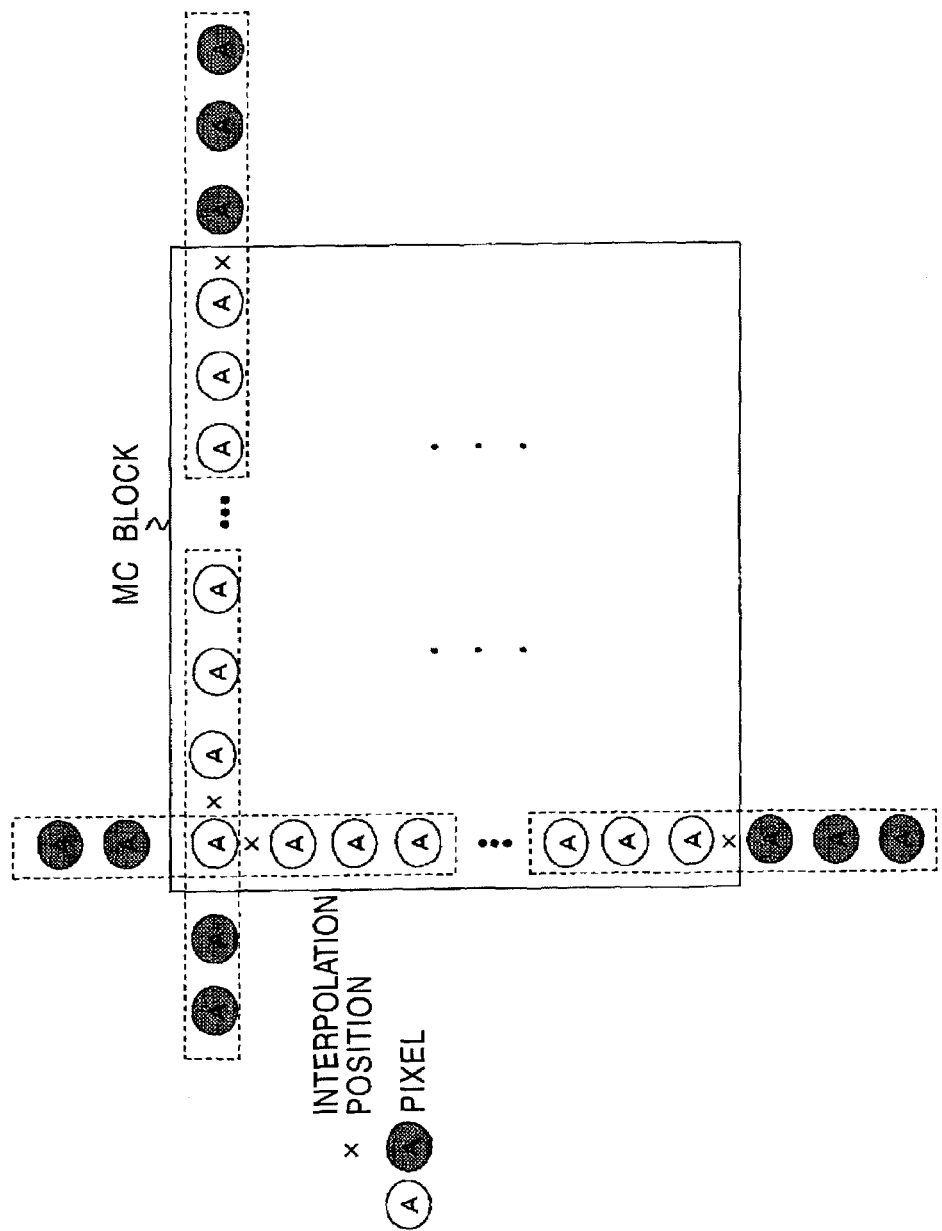
FIG. 4 illustrates overhead of memory access caused by a known coding or decoding apparatus.
Figure 13:
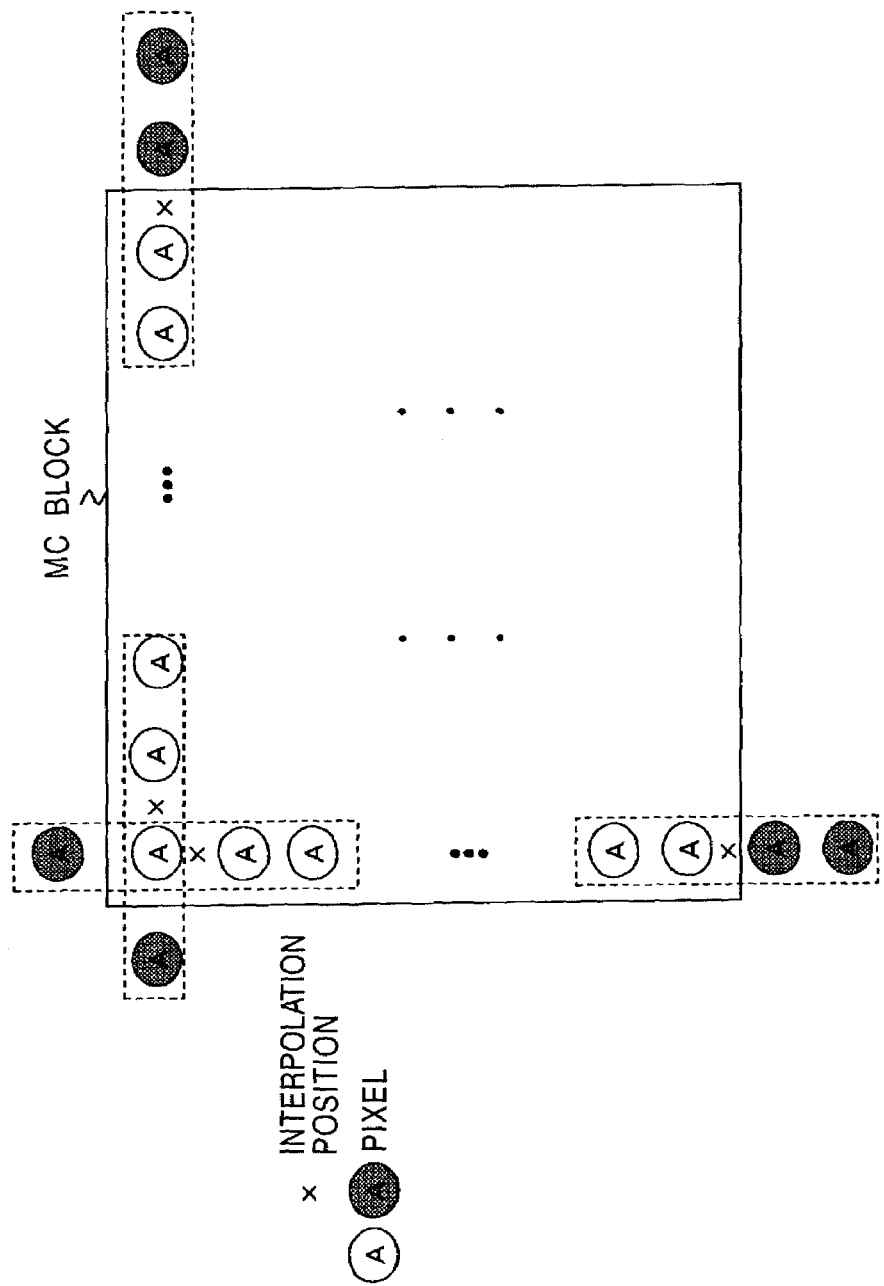
FIG. 13 illustrates overhead of memory access resulting from the first embodiment.

An example of the access pattern to integer-precision pixel data S(A) stored in the frame memory 31 is shown in FIG. 13. With this pattern, for generating interpolation pixel signals at interpolation positions, pixel signals S(A) are read less frequently from the frame memory 31 compared to the counterpart of the related art shown in FIG. 3.

For example, considering a 4×4 MC block, the overhead caused in this embodiment results in 3.0625 (=(7×7)/(4×4)), while the overhead in the related art results in 5.0625 (=(9× 9)/(4×4)).

For the 16×16, 16×8, or 8×16-mode in which the access load on the frame memory 31 is small, the 6-tap filter circuit 42 can be used for performing motion prediction/compensation, and high-quality interpolation pixel signals can be generated, thereby increasing the coding efficiency.

The decoding apparatus 3 shown in FIG. 5 is as follows. It should be noted that the decoding apparatus 3 corresponds to the third image processing apparatus of the present invention.

Figure 14:
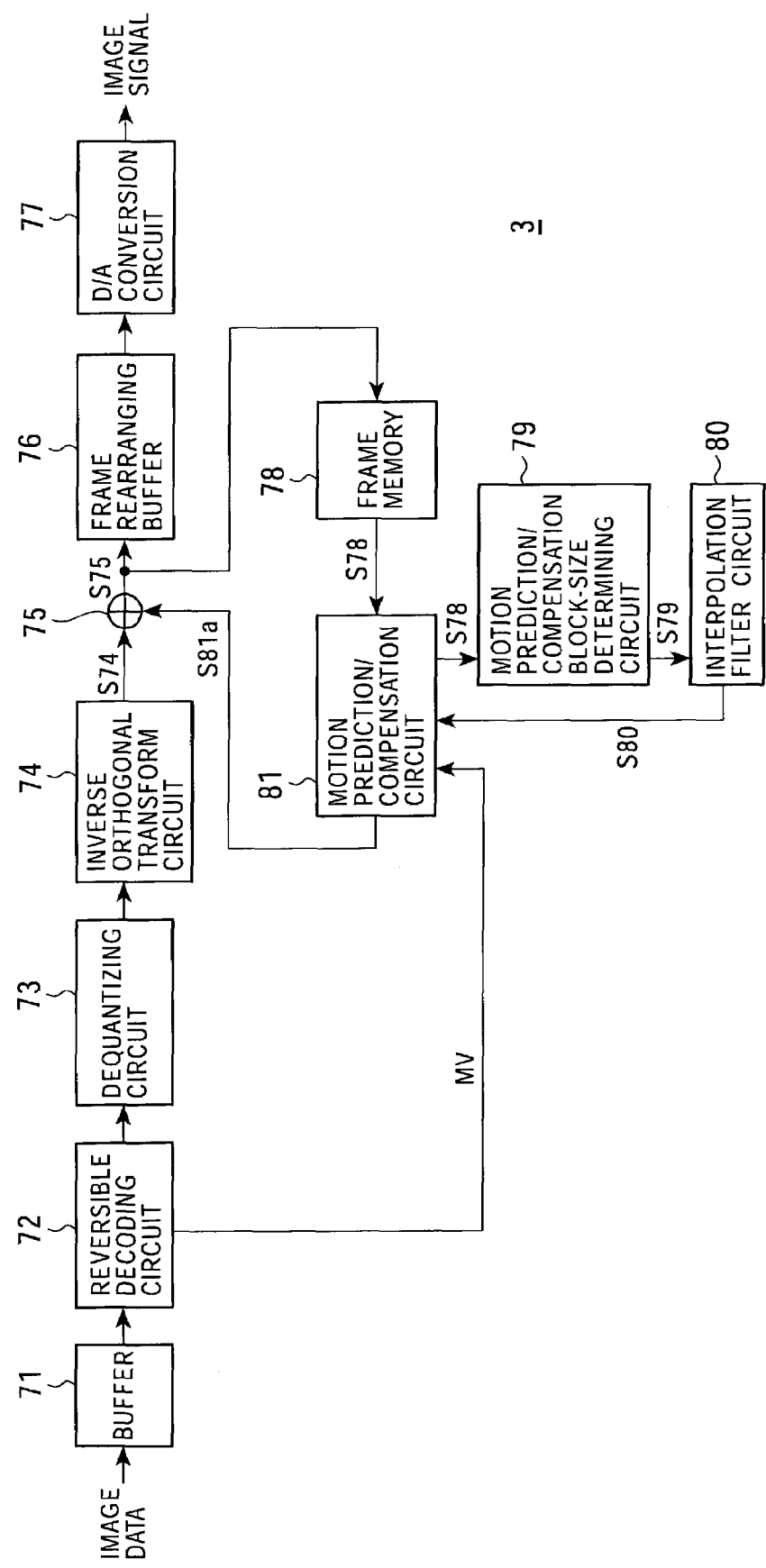
FIG. 14 is a functional block diagram illustrating a decoding apparatus shown in FIG. 5.

FIG. 14 is a functional block diagram illustrating the decoding apparatus 3. The decoding apparatus 3 includes, as shown in FIG. 14, a storage buffer 71, a reversible decoding circuit 72, a dequantizing circuit 73, an inverse orthogonal transform circuit 74, a computation circuit 75, a frame rearranging circuit 76, a D/A conversion circuit 77, a frame memory 78, a motion prediction/compensation block-size determining circuit 79, an interpolation filter selection circuit 80, and a motion prediction/compensation circuit 81. The computation circuit 75 corresponds to the image generating circuit of the present invention.

Upon receiving an image signal coded and modulated in the coding apparatus 2 disposed in the transmitter shown in FIG. 5, the storage buffer 71 demodulates the image signal and stores the demodulated image data therein.

The reversible decoding circuit 72 decodes the image data input from the storage buffer 71 according to decoding processing corresponding to the coding processing performed in the reversible coding circuit 27, and outputs the decoded image data to the dequantizing circuit 73. The reversible decoding circuit 72 also outputs the motion vector MV obtained during the decoding processing to the motion prediction/compensation circuit 81.

The dequantizing circuit 73 dequantizes the image data input from the reversible decoding circuit 72 so as to generate an image signal, and outputs it to the inverse orthogonal transform circuit 74.

The inverse orthogonal transform circuit 74 performs inverse orthogonal transform on the image signal input from the dequantizing circuit 73 according to inverse orthogonal transform processing corresponding to the orthogonal transform processing performed in the orthogonal transform circuit 25 shown in FIG. 6, and outputs a resulting image signal S74 to the computation circuit 75.

The computation circuit 75 adds the image signal S74 from the inverse orthogonal transform circuit 74 and a predictive image signal S81a from the motion prediction/compensation circuit 81 so as to generate an image signal S75 (the second image data of the third aspect of the present invention), and outputs the image signal S75 to the frame rearranging circuit 76 and the frame memory 78.

The frame rearranging circuit 76 rearranges the frames of the image signal S75 in the display order, and outputs the rearranged image signal to the D/A conversion circuit 77.

The D/A conversion circuit 77 converts the digital image signal input from the frame rearranging circuit 76 into an analog signal, and outputs it.

The frame memory 78 stores the image signal S75.

The motion prediction/compensation block-size determining circuit 79 determines the type (mode) of MC block, which serves as the unit for performing motion prediction/compensation in the motion prediction/compensation circuit 81, based on an image signal S78 from the motion prediction/compensation circuit 81, and outputs a signal S79 indicating the determined mode to the interpolation filter selection circuit 80.

The interpolation filter selection circuit 80 selects the filter circuit used for interpolating the pixel data in the motion prediction/compensation circuit 81 based on the signal S79 indicating the determined mode input from the motion prediction/compensation block-size determining circuit 79, and outputs a filter selection signal S80 indicating the selected filter circuit to the motion prediction/compensation circuit 81.

The motion prediction/compensation circuit 81 receives the image signal S78 read from the frame memory 78. By using the image signal S78 and the motion vector MV input from the reversible decoding circuit 72, the motion prediction/compensation circuit 81 generates a predictive image signal 81a having 1/4 pixel precision based on the designated type (mode) of the MC block, and outputs the predictive image signal 81a to the computation circuit 75.

Figure 15:
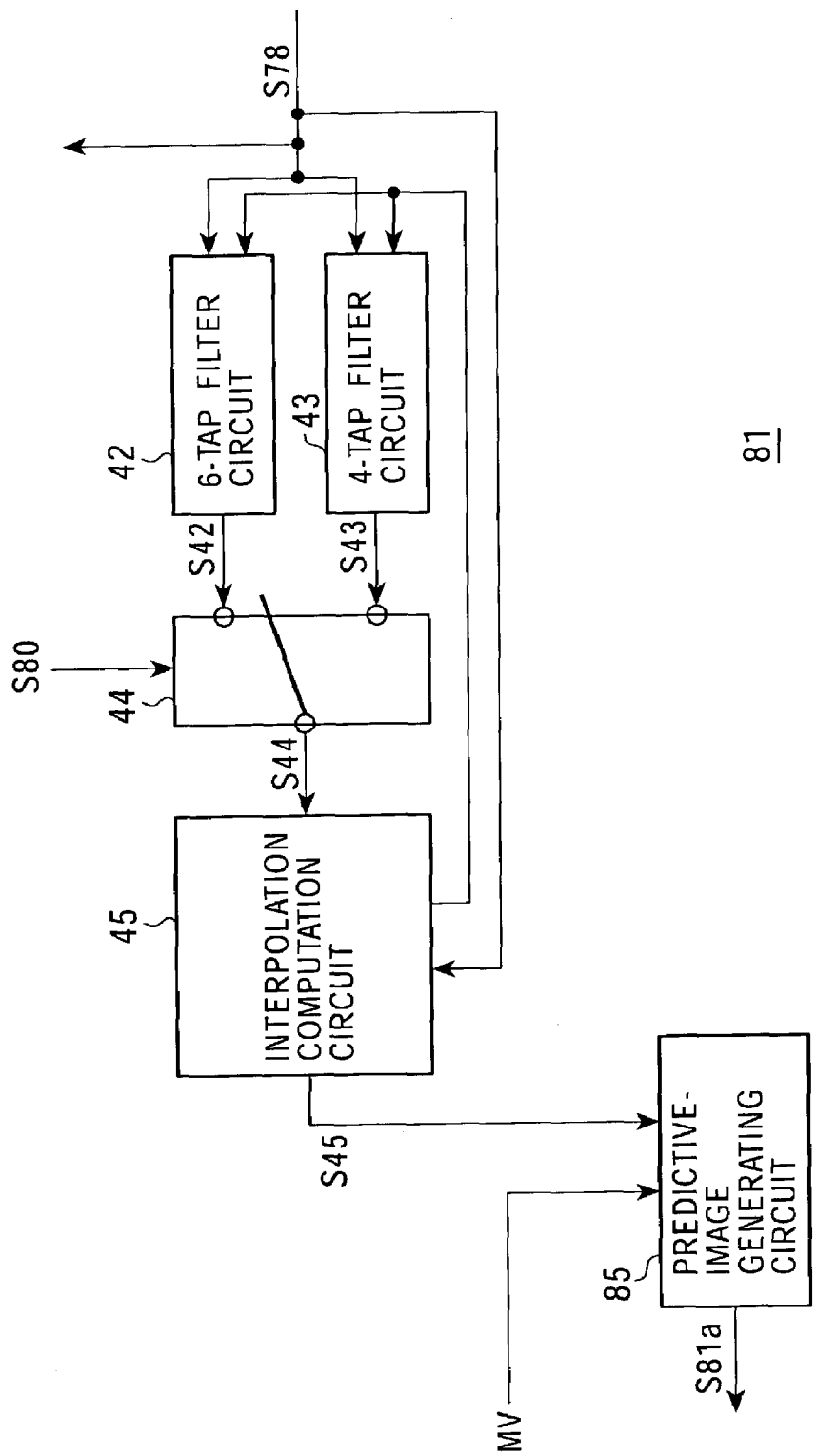
FIG. 15 is a functional block diagram illustrating a motion prediction/compensation circuit shown in FIG. 14.

FIG. 15 is a functional block diagram illustrating the motion prediction/compensation circuit 81 shown in FIG. 14. The motion prediction/compensation circuit 81 includes, as shown in FIG. 15, a 6-tap filter circuit 42, a 4-tap filter circuit 43, a selection circuit 44, an interpolation computation circuit 45, and a predictive-image generating circuit 85.

In FIG. 15, the same elements as those shown in FIG. 8 are designated with like reference numerals.

The 6-tap filter circuit 42 corresponds to the first processing circuit of the present invention, the 4-tap filter circuit 43 corresponds to the second processing circuit of the present invention, and the selection circuit 44 corresponds to the selection circuit of the present invention.

By using 6 pixel signals contained in the image signal S78 (the first image data of the third aspect of the present invention), the 6-tap filter circuit 42 generates an image signal S42 (the third image data of the third aspect of the present invention) including interpolation pixel signals, which are pixel data at interpolation pixel positions separated from the positions of the above-described 6 pixels, by a predetermined distance, and outputs the image signal S42 to the selection circuit 44.

By using 4 pixel signals contained in the image signal S78, the 4-tap filter circuit 43 generates an image signal S43 (the third image data of the third aspect of the present invention) including interpolation pixel signals, which are pixel data at interpolation pixel positions separated from the positions of the above-described 4 pixels by a predetermined distance, and outputs the image signal S43 to the selection circuit 44.

As described below, the selection circuit 44 selects one of the 6-tap filter circuit 42 and the 4-tap filter circuit 43 based on the filter selection signal S80, which is determined according to the MC block mode (see FIG. 7), input from the interpolation filter selection circuit 80.

When the filter selection signal S80 input from the interpolation filter selection circuit 80 shown in FIG. 14 indicates that the 6-tap filter circuit 42 is to be selected, the selection circuit 44 selects the image signal S42, and outputs it to the interpolation computation circuit 45 as the image signal S44.

When the filter selection signal S80 indicates that the 4-tap filter circuit 43 is to be selected, the selection circuit 44 selects the image signal S43, and outputs it to the interpolation computation circuit 45 as the image signal S44.

The interpolation computation circuit 45 performs processing similarly to the counterpart shown in FIG. 8, except that the interpolation computation circuit 45 receives the image signal S78.

The predictive-image generating circuit 85 generates the predictive image signal S81a having 1/4 pixel precision by using the motion vector MV input from the reversible decoding circuit 72 and an image signal S45 input from the interpolation computation circuit 45, and outputs the predictive image signal S81a to the computation circuit 75 shown in FIG. 14.

An example of the operation of the motion prediction/compensation circuit 81 shown in FIG. 15 is given below.

Upon receiving the reference image signal S78 read from the frame memory 78, the 6-tap filter circuit 42 and the 4-tap filter circuit 43 generate the image signal S42 and the image signal S43, respectively, and outputs them to the selection circuit 44.

When the filter selection signal S80 input from the interpolation filter selection circuit 80 shown in FIG. 14 indicates that the 6-tap filter circuit 42 is to be selected, the selection circuit 44 selects the image signal S42, and outputs it to the interpolation computation circuit 45 as the image signal S44.

When the filter selection signal S80 indicates that the 4-tap filter circuit 43 is to be selected, the selection circuit 44 selects the image signal S43, and outputs it to the interpolation computation circuit 45 as the image signal S44.

Then, the interpolation computation circuit 45 generates an interpolation pixel signal having 1/4 pixel precision, and outputs the resulting image signal S45 to the predictive-image generating circuit 85.

Subsequently, the predictive-image generating circuit 85 generates the predictive image signal S81a having 1/4 pixel precision by using the motion vector MV input from the reversible decoding circuit 72 and the image signal S45 input from the interpolation computation circuit 45, and outputs the predictive image signal S81a to the computation circuit 75 shown in FIG. 14.

An example of the overall operation of the decoding apparatus 3 is described below.

In the decoding apparatus 3, after input image data is stored in the buffer 71, it is output to the reversible decoding circuit 72. Then, in the reversible decoding circuit 72, reversible decoding, such as variable-length decoding or arithmetic decoding, is performed on the image data based on the image compression information format. For inter-coded frames, the motion vector MV stored in the header of the image signal is also decoded in the reversible decoding circuit 72, and is output to the motion prediction/compensation circuit 81.

The quantized transform coefficient output from the reversible decoding circuit 72 is input into the dequantizing circuit 73, and a transform coefficient is generated therein. In the inverse orthogonal transform circuit 74, inverse orthogonal transform, such as inverse DCT or inverse Karhunen-Loeve transform, is performed on the transform coefficient based on the predetermined image compression information format. If the frame is intra-coded, the image information output from the inverse orthogonal transform circuit 74 is stored in the frame rearranging circuit 76, and is converted into an analog signal in the D/A conversion circuit 77, and is then output.

If the frame is inter-coded, the predictive image signal S81a is generated based on the motion vector MV and the reference image signal S78 stored in the frame memory 78 by using the filter circuit 42 or 43 selected based on the filter selection signal S80. The predictive image signal S81a and the image signal S74 output from the inverse orthogonal transform circuit 74 are added in the computation circuit 75.

As discussed above, as in the coding apparatus 2, the decoding apparatus 3 can be made smaller and less expensive, and also, the power consumption of the decoding apparatus 3 can also be reduced.

Second Embodiment

In the above-described first embodiment, motion prediction/compensation is performed with 1/4 pixel precision in the coding apparatus 2 and the decoding apparatus 3. In the second embodiment, motion prediction/compensation is performed with 1/2 pixel precision in the coding apparatus 2 and the decoding apparatus 3.

In the second embodiment, the configurations and operations of the coding apparatus 2 and the decoding apparatus 3 are similar to those of the counterparts of the first embodiment, except for the processing performed in the interpolation computation circuit 45 shown in FIGS. 8 and 15.

In this embodiment, in the interpolation computation circuit 45, interpolation pixel signals S(b) at interpolation positions b corresponding to 1/2 pixel positions shown in FIGS. 11 and 12 contained in the image signal S44 are clipped with a range [0, 255], and from the clipped interpolation pixel signals S(b) and the pixel signals S(A) contained in the image signal S40 input from the memory access circuit 40, the image signal S45 having 1/2 pixel precision is generated. Then, the generated image signal S45 is output to the motion-vector generating circuit 46 and the predictive-image generating circuit 47.

By using the designated mode of the MC block as the unit, the motion-vector generating circuit 46 generates a motion vector MV with 1/2 pixel precision, and the predictive-image generating circuit 47 generates the predictive image signal 35a with 1/2 pixel precision.

Third Embodiment

Figure 1:
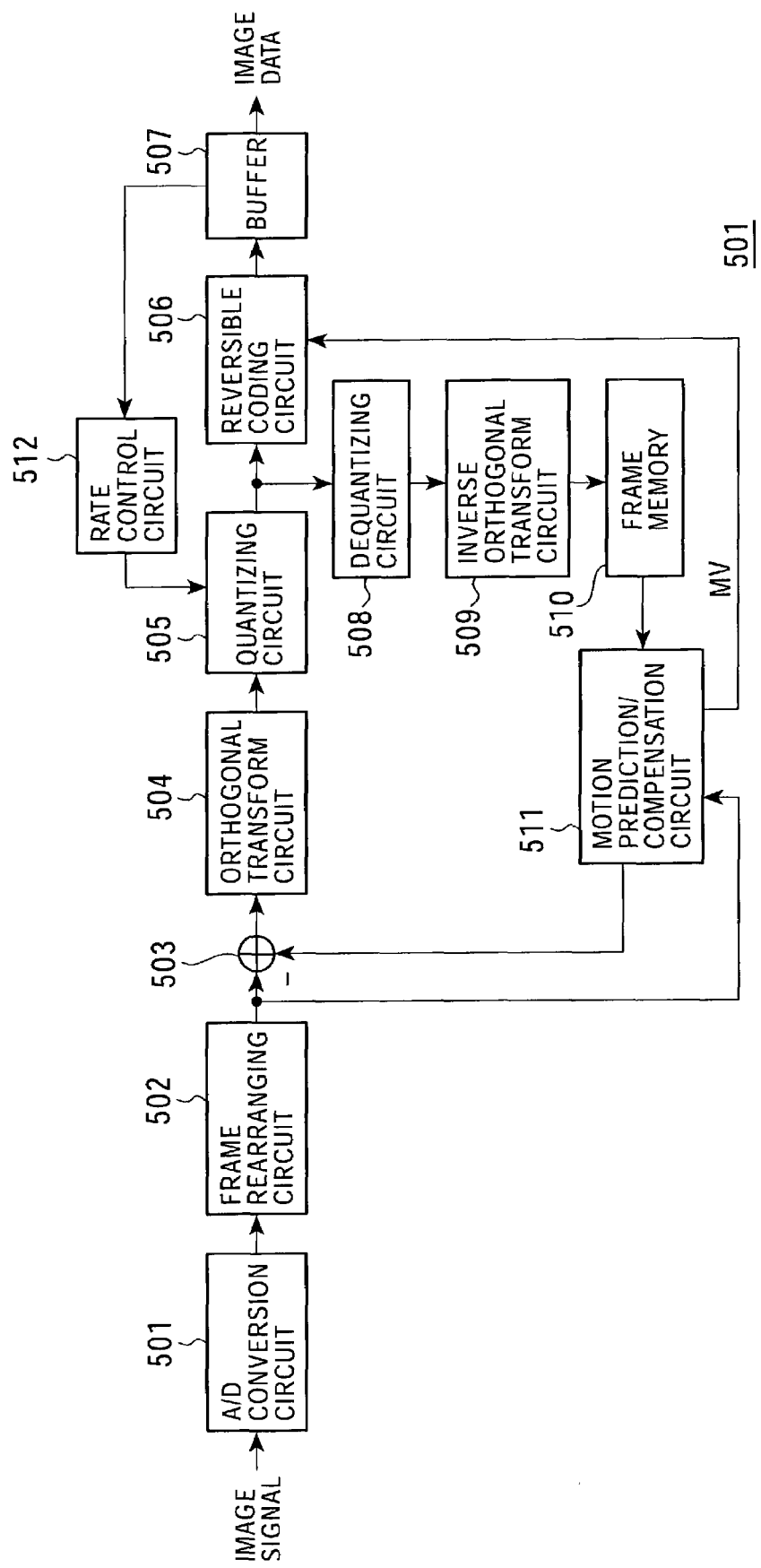
FIG. 1 is a functional block diagram illustrating a known coding apparatus.
Figure 2:
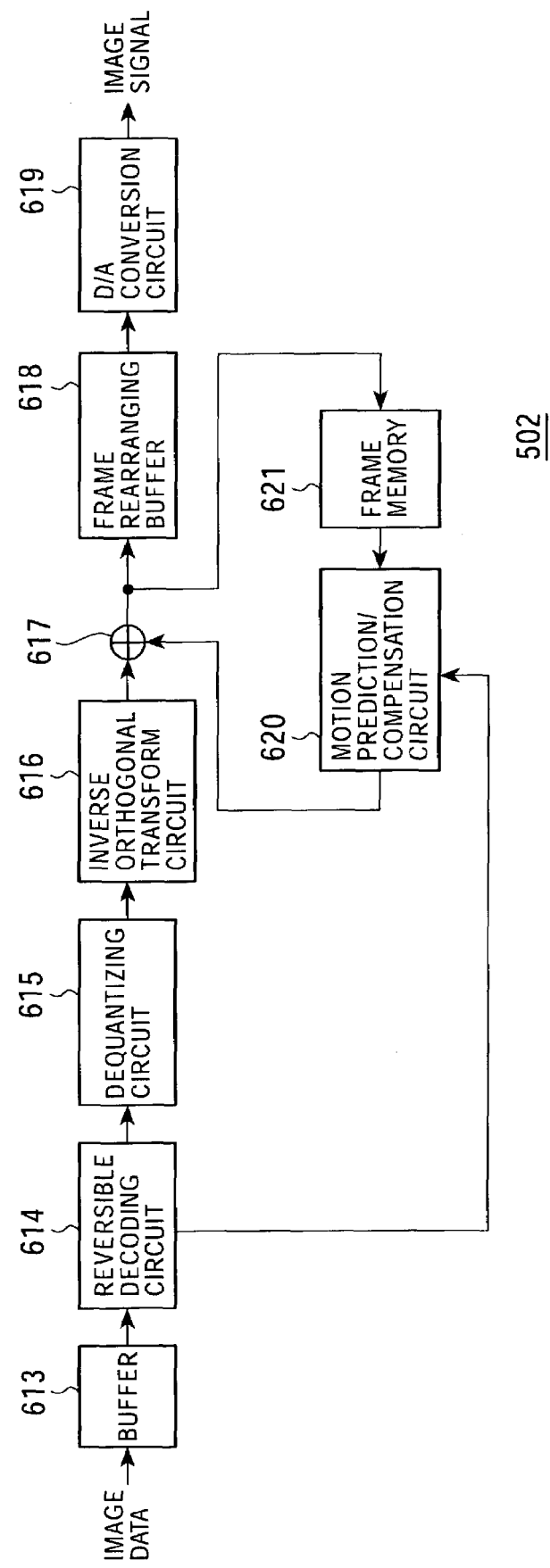
FIG. 2 is a functional block diagram illustrating a known decoding apparatus.

In the third embodiment, motion prediction/compensation is performed with 1/8 pixel precision in the coding apparatus 2 and the decoding apparatus 3 shown in FIG. 1.

The communication system of the third embodiment is similar to that of the first embodiment, except for the configurations of a motion prediction/compensation circuit 135 of the coding apparatus 2 and a motion prediction/compensation circuit 181 of the decoding apparatus 3.

Figure 16:
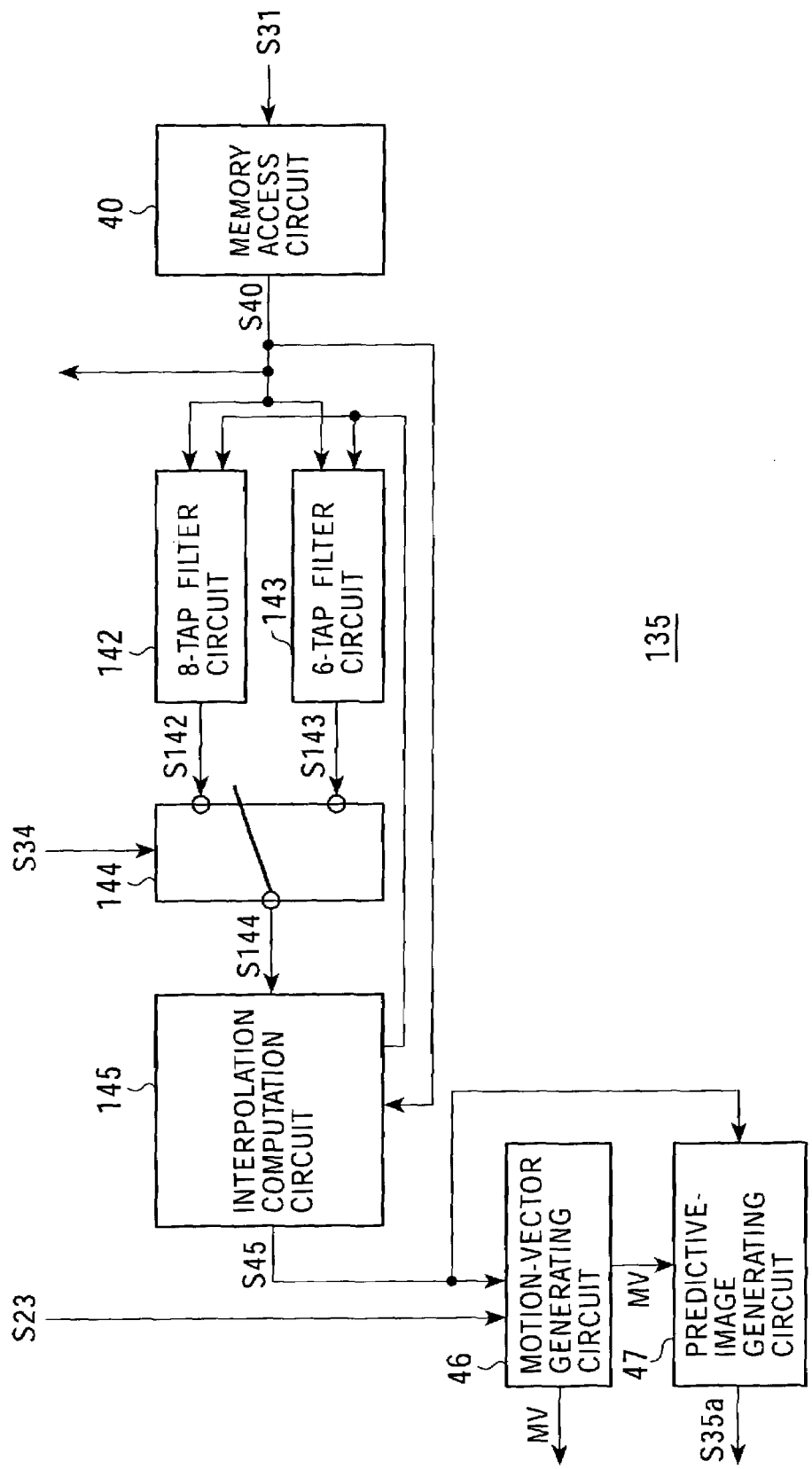
FIG. 16 is a functional block diagram illustrating a coding apparatus according to a third embodiment of the present invention.

FIG. 16 is a functional block diagram illustrating the motion prediction/compensation circuit 135 of the coding apparatus 2.

The motion prediction/compensation circuit 135 includes, as shown in FIG. 16, a memory access circuit 40, an 8-tap filter circuit 142, a 6-tap filter circuit 143, a selection circuit 144, an interpolation computation circuit 145, a motion-vector generating circuit 46, and a predictive-image generating circuit 47.

In FIG. 16, the same elements as those shown in FIG. 8 are designated with like reference numerals.

The 8-tap filter circuit 142 is a FIR filter. By using 8 pixel signals contained in the image signal S40 or interpolation pixel signals at 8 interpolation pixel positions input from the interpolation computation circuit 145, the 8-tap filter circuit 142 generates an image signal S142 containing interpolation pixel signals at the interpolation positions separated from the above-described 8 pixel positions and the 8 interpolation pixel positions by a predetermined distance, and outputs the image signal S142 to the selection circuit 144.

The 8-tap filter circuit 142 generates interpolation pixel signals at 1/4 interpolation positions by using filter coefficients {−3, 12, −37, 229, 71, −21, 6, −1}, and generates interpolation pixel signals at 2/4 interpolation positions by using filter coefficients {−3, 12, −39, 158, 158, −39, 12, −3}. The 8-tap filter circuit 142 also generates interpolation pixel signals at 3/4 interpolation positions by using filter coefficients {−1, 6, −21, 71, 229, −37, 12, −3}.

The 6-tap filter circuit 143 is a FIR filter. By using 6 pixel signals contained in the image signal S40 or interpolation pixel signals at 6 interpolation pixel positions input from the interpolation computation circuit 145, the 6-tap filter circuit 143 generates an image signal S143 containing interpolation pixel signals at 1/4, 2/4, and 3/4 interpolation positions corresponding to the above-described 6 pixel positions or the 6 interpolation pixel positions, and outputs the image signal S143 to the selection circuit 144.

If the MC block mode is 16×16, 16×8, or 8×16, the selection circuit 144 selects the image signal S142 based on the filter selection signal S34, and outputs the image signal S142 to the interpolation computation circuit 145 as an image signal S144.

If the MC block mode is 8×8, the selection circuit 44 selects the image signal S143 based on the filter selection signal S34, and outputs the image signal S143 to the interpolation computation circuit 145 as the image signal S144.

Figure 17:
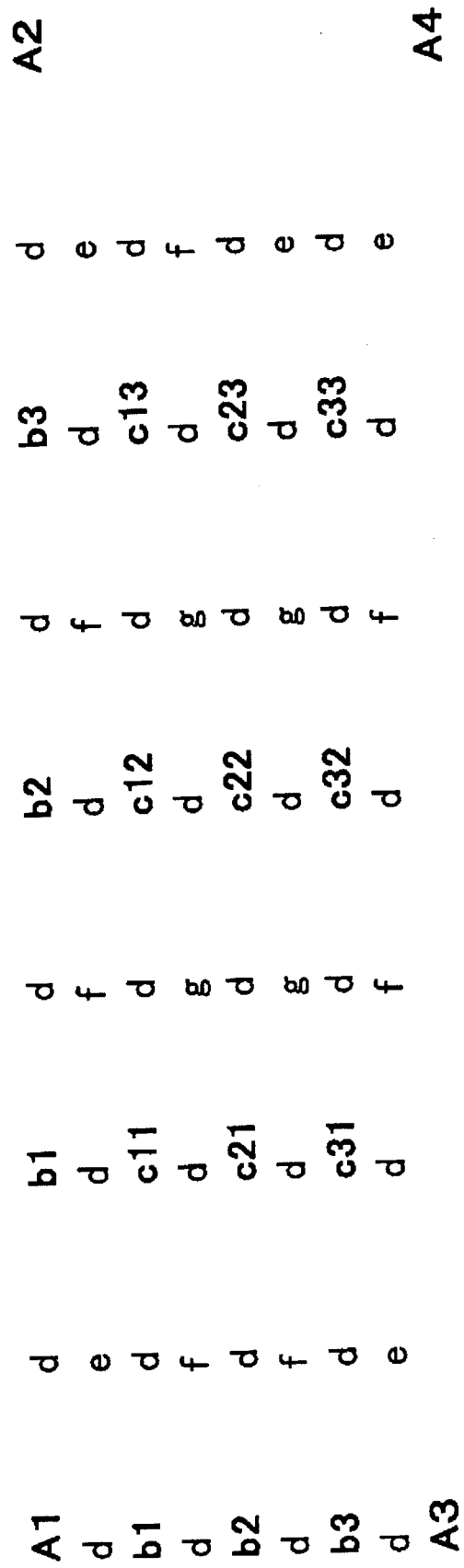
FIG. 17 illustrates a method for generating interpolation pixel signals used in the third embodiment of the present invention.

The interpolation computation circuit 145 rounds the interpolation pixel signals at interpolation positions b and c shown in FIG. 17 contained in the image signal S144 input from the selection circuit 144, and clips the resulting interpolation pixel signals with a range of [0, 255], thereby generating interpolation pixel signals S(b) and S(c). By using the interpolation pixel signals S(b) and S(c) and the pixel signals contained in the image signal S40 input from the memory access circuit 40, the interpolation computation circuit 145 generates interpolation pixel signals S(d), S(e), S(f), and S(g) at interpolation positions d, e, f, and g, respectively, shown in FIG. 17. Then, by using the interpolation pixel signals S(d), S(e), S(f), and S(g) and the pixel signals contained in the image signal S40, the interpolation computation circuit 145 generates an image signal S145 having pixel data with 1/8 pixel precision, i.e., pixel data having the number of pixels 8 times greater than that of the image signal S40. The image signal S145 is then output to the motion-vector generating circuit 46 and the predictive-image generating circuit 47.

More specifically, the interpolation computation circuit 145 normalizes the interpolation pixel signal S(b)' at interpolation positions b with [(S(b)'+128)/256], and clips the resulting signal with a range of [0, 255] to generate the interpolation pixel signal S(b).

The interpolation computation circuit 145 also calculates the product sum of the pixel signal S40 and the filter coefficient by using the 8-tap filter circuit 142 or the 6-tap filter circuit 143 in the horizontal and vertical directions, divides the product sum by 65536, rounds the resulting value, and clips it with a range of [0, 255], thereby generating the interpolation pixel signals corresponding to the phases at interpolation positions c shown in FIG. 17.

Figure 18:
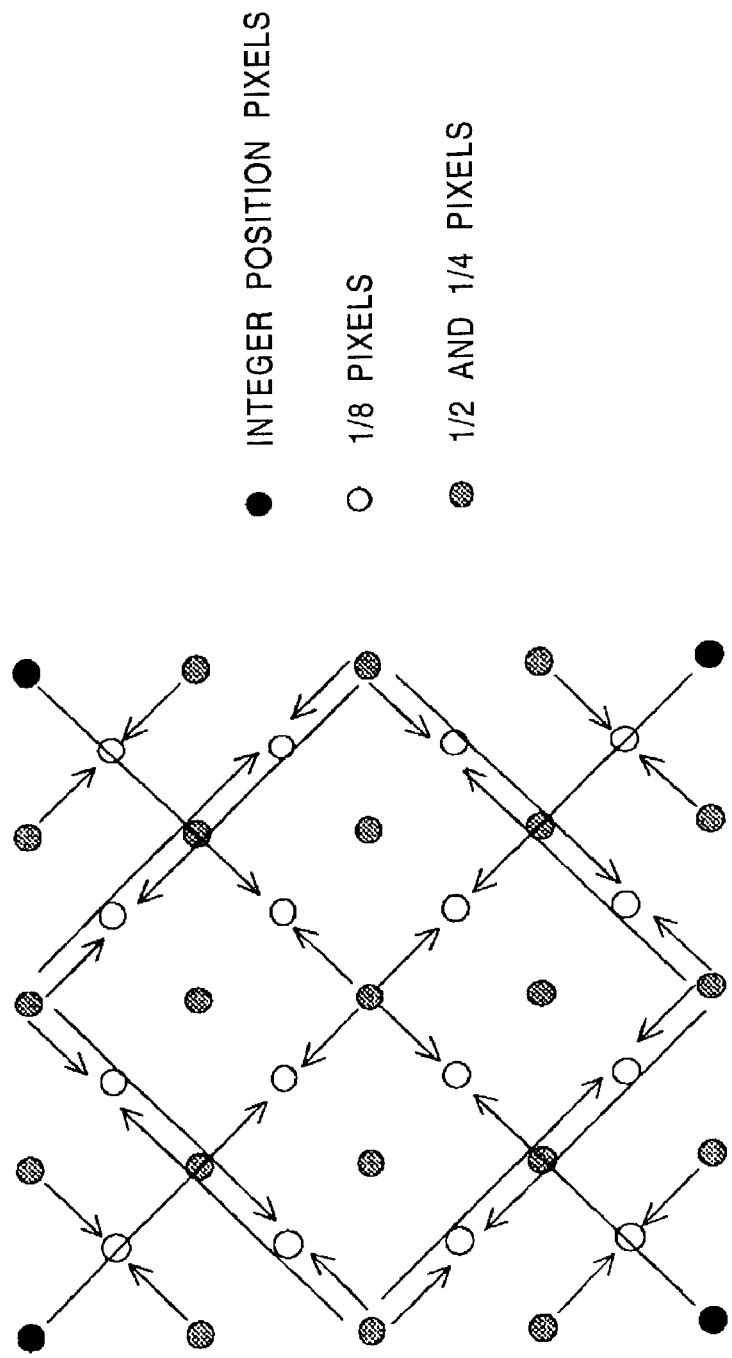
FIG. 18 illustrates a method for generating interpolation pixel signals having 1/8 pixel precision used in the third embodiment of the present invention.

The interpolation computation circuit 145 generates interpolation pixel signals at 1/8 interpolation positions according to the algorithm shown in FIG. 18.

More specifically, the interpolation computation circuit 145 generates interpolation pixel signals corresponding to the phases at interpolation positions d shown in FIG. 17 by averaging two interpolation pixel signals at pixel position A and interpolation position b or c located most adjacent to the corresponding interpolation position d in the horizontal and vertical directions.

The interpolation computation circuit 145 generates interpolation pixel signals at interpolation positions e corresponding to the phases having 1/8 pixel precision shown in FIG. 17 according to averaging and rounding by using the interpolation pixel signals corresponding to interpolation positions b1.

The interpolation computation circuit 145 also generates interpolation pixel signals corresponding to interpolation positions g shown in FIG. 17 according to computation of [S(A)+S(3c22)+2)/4].

The interpolation computation circuit 145 generates interpolation pixel signals corresponding to interpolation positions f shown in FIG. 17 along the diagonals according to computation of [(3b1+b1+2)/4].

Subsequently, by using the designated mode of the MC block as the unit, the motion-vector generating circuit 46 generates the motion vector MV, and the predictive-image generating circuit 47 generates the predictive image signal S35a with 1/8 precision.

Figure 19:
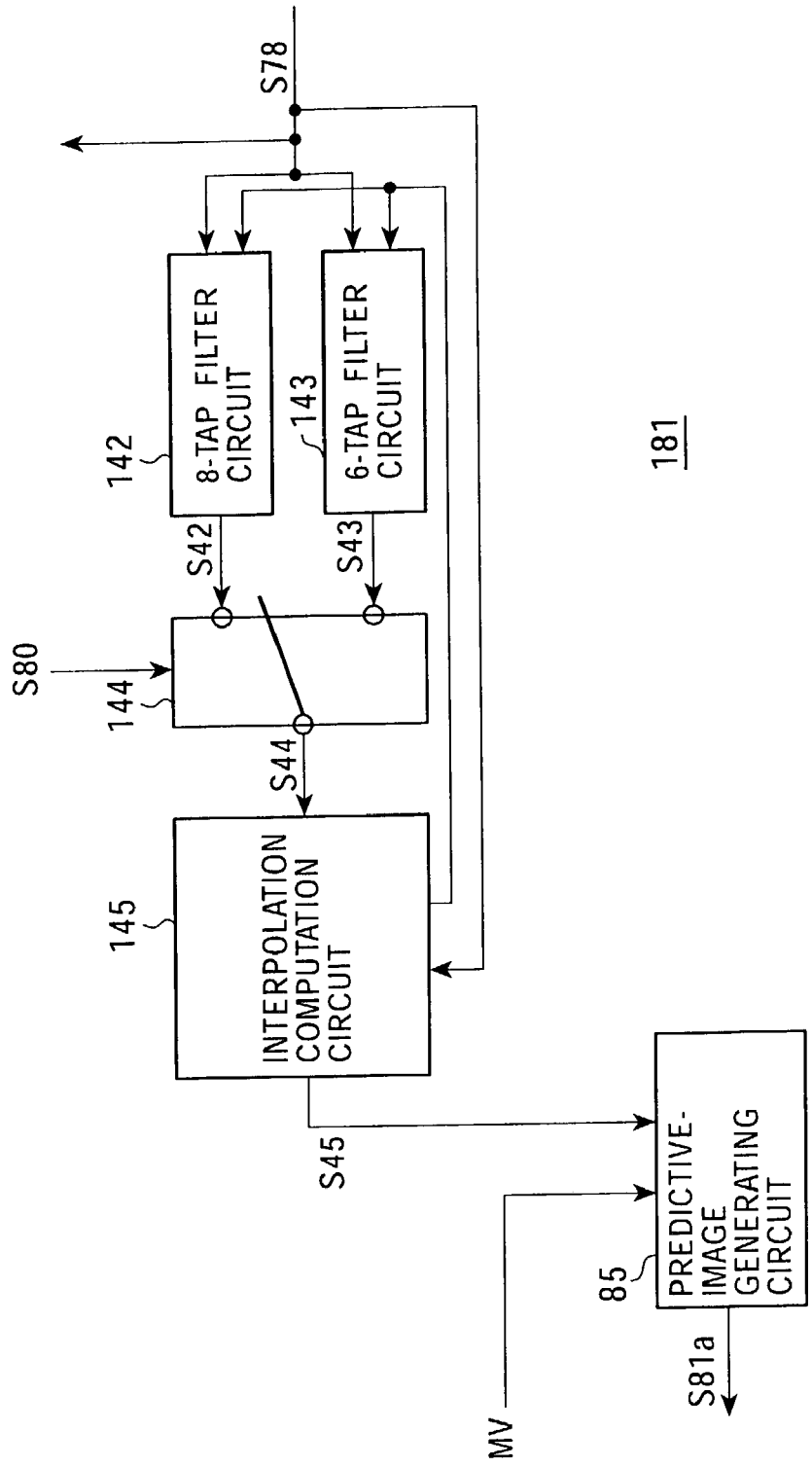
FIG. 19 is a functional block diagram illustrating a decoding apparatus according to the third embodiment of the present invention.

FIG. 19 is a schematic diagram illustrating the motion prediction/compensation circuit 181 of the decoding apparatus 3 corresponding to the motion prediction/compensation circuit 135 of the coding apparatus 2 shown in FIG. 16.

The motion prediction/compensation circuit 181 includes, as shown in FIG. 19, an 8-tap filter circuit 142, a 6-tap filter circuit 143, a selection circuit 144, an interpolation computation circuit 145, and a predictive-image generating circuit 85.

The processings of the 8-tap filter circuit 142, the 6-tap filter circuit 143, the selection circuit 144, and the interpolation computation circuit 145 are similar to those of the corresponding elements shown in FIG. 16.

The processing of the predictive-image generating circuit 85 is similar to that of the counterpart of the first embodiment shown in FIG. 15, except that the image signal S45 having 1/8 pixel precision is to be processed.

Fourth Embodiment

In the first embodiment, the interpolation filter selection circuit 34 of the coding apparatus 2 and the interpolation filter selection circuit 80 of the decoding apparatus 3 select the filter circuit based on the designated mode of the MC block. In a fourth embodiment, the filter circuit is selected by using not only the MC block mode, but also the picture type of an image to be coded.

Figure 20:
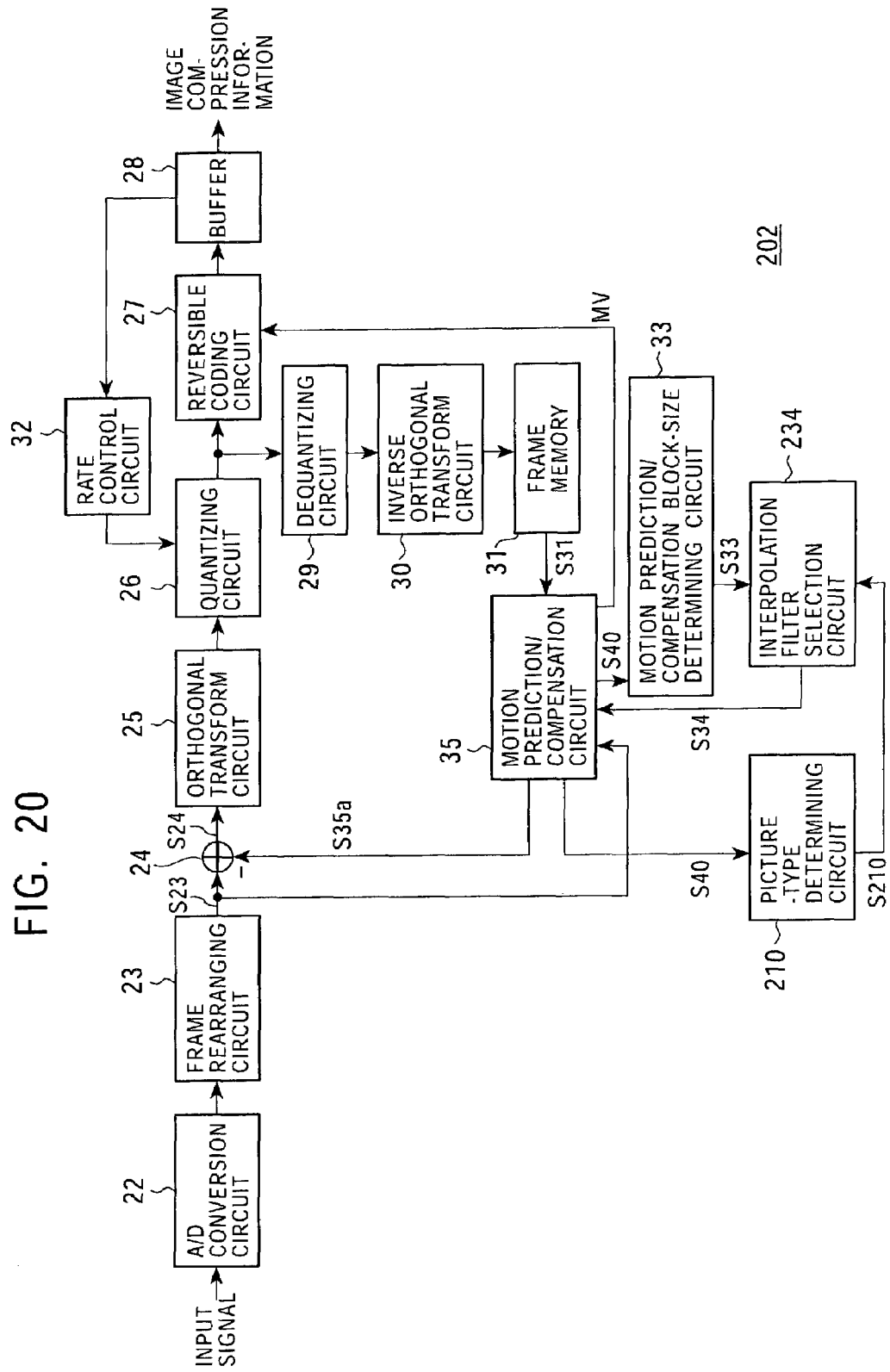
FIG. 20 is a functional block diagram illustrating a coding apparatus according to a fourth embodiment of the present invention.

FIG. 20 is a functional block diagram illustrating a coding apparatus 202 of the fourth embodiment.

The coding apparatus 202 shown in FIG. 20 differs from the coding apparatus 2 shown in FIG. 6 in that a picture-type determining circuit 210 is provided, and an interpolation filter selection circuit 234 is used instead of the interpolation filter selection circuit 34 shown in FIG. 6.

Upon receiving the image signal S40 indicating a target image from the motion-vector generating circuit 46 shown in FIG. 8, the picture-type determining circuit 210 determines whether the picture type is I (intra-coded picture), P (predictive-coded picture), or B (bidirectionally predictive-coded picture) based on the image signal S40, and outputs a picture-type determination signal S210 indicating a determination result to the interpolation filter selection circuit 234.

Figure 21:
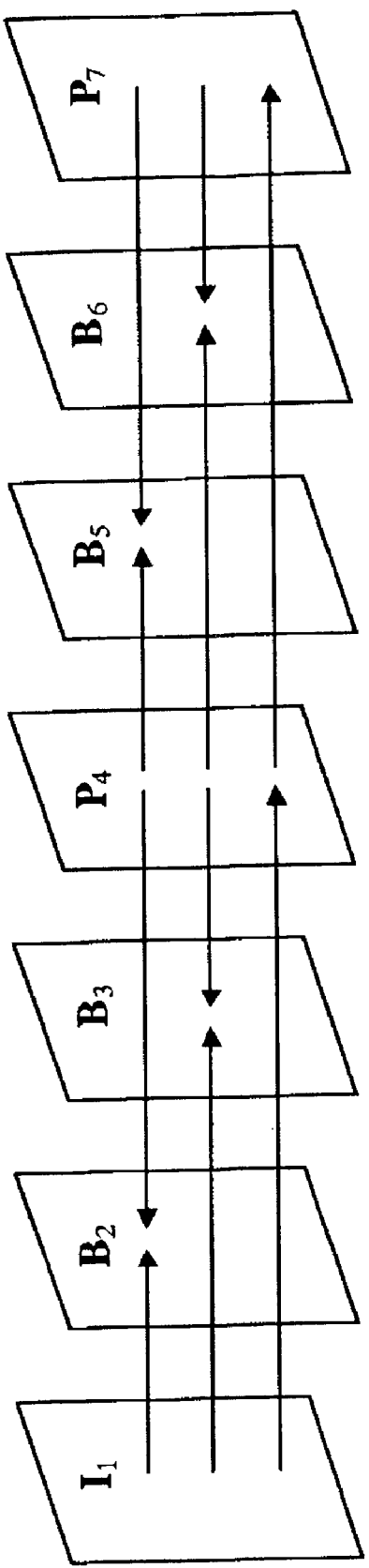
FIG. 21 illustrates picture types.

As shown in FIG. 21, I-pictures are intra-frame coded pictures, P-pictures are inter-frame forward predictive-coded pictures, and B-pictures are bidirectionally predictive-coded pictures.

The interpolation filter selection circuit 234 selects one of the 6-tap filter circuit 42 and the 4-tap filter circuit 43 based on the picture type and the MC mode.

That is, the interpolation filter selection circuit 234 determines based on the MC-mode determination signal S33 and the picture-type determination signal S210 whether the 6-tap filter circuit 42 or the 4-tap filter circuit 43 is to be selected in the motion prediction/compensation circuit 35 or interpolation pixel signals are generated by linear interpolation in the interpolation computation circuit 45, in which case, neither of the filters is selected in the interpolation computation circuit 45, and outputs the filter selection signal S34 indicating a determination result to the motion prediction/compensation circuit 35.

More specifically, when the picture-type determination signal S210 indicates P and when the MC-mode determination signal S33 indicates 16×16, 16×8, or 8×16 (i.e., greater than 8×8), the interpolation filter selection circuit 234 outputs the filter selection signal S34 indicating that the 6-tap filter circuit 42 is to be selected to the motion prediction/compensation circuit 35. In other cases, the interpolation filter selection circuit 34 outputs the filter selection signal S34 indicating that the 4-tap filter circuit 43 is to be selected to the motion prediction/compensation circuit 35.

When the picture-type determination signal S210 indicates B and when the MC-mode determination signal S33 indicates 16×16, 16×8, or 8×16, the interpolation filter selection circuit 234 outputs the filter selection signal S34 indicating that the 4-tap filter circuit 43 is to be selected to the motion prediction/compensation circuit 35. In other cases, the interpolation filter selection circuit 234 outputs the filter selection signal S34 indicating that interpolation pixel signals are generated according to linear interpolation to the motion prediction/compensation circuit 35.

Instead of employing the information indicating the type of picture, P or B, the picture-type determining circuit 210 may generate information indicating whether the motion prediction/compensation circuit 35 performs unidirectional (forward or backward) prediction or bidirectional prediction, and the interpolation filter selection circuit 234 may select the filter circuit based on such information.

Since B pictures require bidirectional (forward and backward) motion prediction/compensation, a greater amount of computation and a wider memory band are required than those of P pictures. However, in this embodiment, by switching the interpolation filter circuits, the computation amount and the memory band can be decreased.

Pixel values having 1/4 pixel precision can be generated based on the pixel values having 1/2 pixel precision generated as described above according to a method similar to that defined in the H.26L standards. The same applies to motion prediction/compensation with 1/8 pixel precision.

Figure 22:
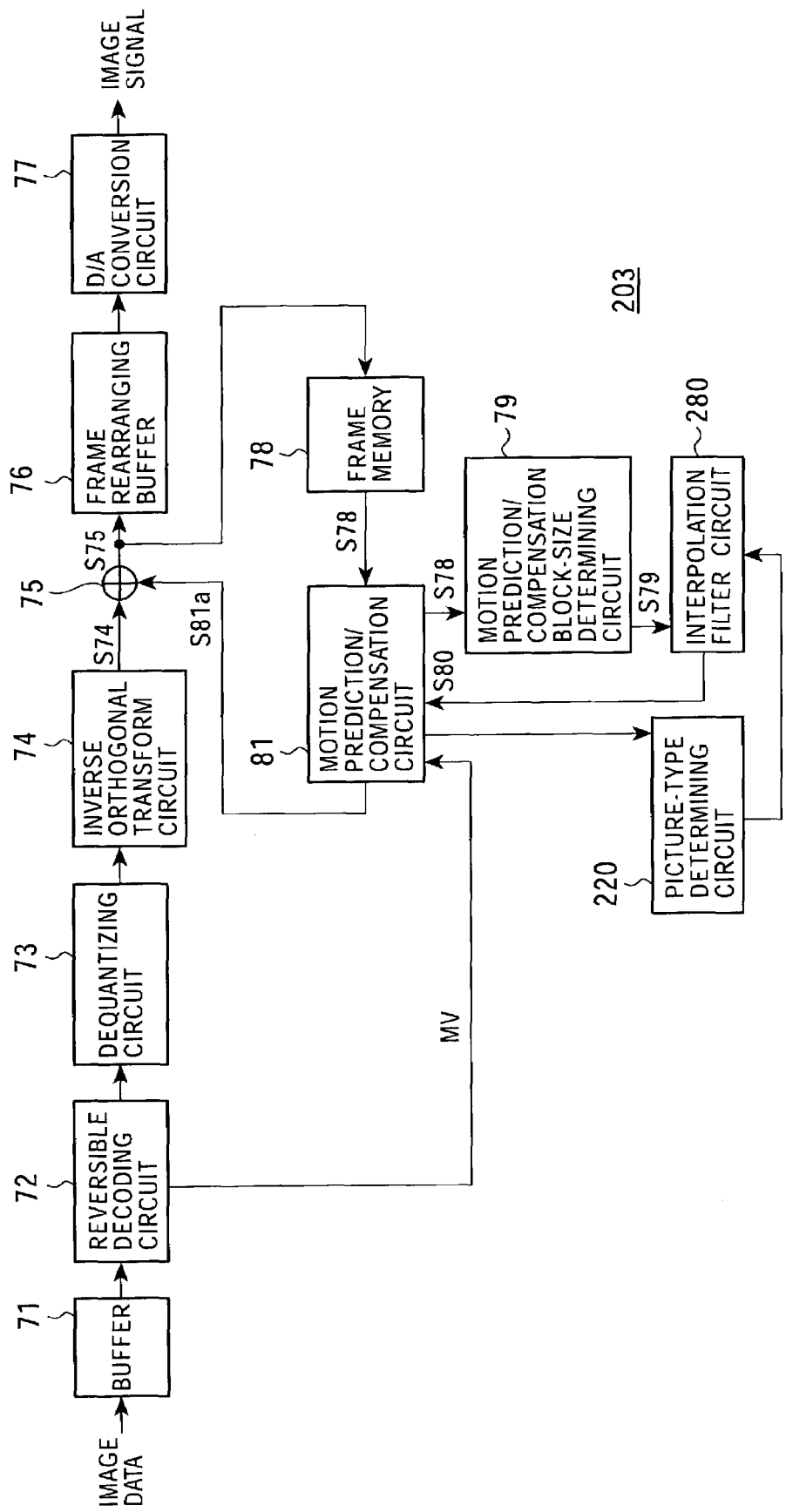
FIG. 22 is a functional block diagram illustrating a decoding apparatus according to the fourth embodiment of the present invention.

FIG. 22 is a functional block diagram illustrating the decoding apparatus 203 corresponding to the coding apparatus 202 shown in FIG. 20.

In FIG. 22, the same elements as those shown in FIG. 14 are designated with like reference numerals. A picture-type determining circuit 220 and an interpolation filter selection circuit 280 are basically similar to the picture-type determining circuit 210 and the interpolation filter selection circuit 234, respectively, shown in FIG. 20.

According to the fourth embodiment, advantages similar to those obtained by the first embodiment can be achieved.

In the fourth embodiment, the interpolation filter selection circuit 234 generates the filter selection signal S34 based on both the MC-mode determination signal S33 and the picture-type determination signal S210. However, only the picture-type determination signal S210 may be used for generating the filter selection signal S34.

Fifth Embodiment

A communication system of a fifth embodiment is similar to that of the first embodiment, except for the feature described below.

In the fifth embodiment, a first operation mode and a second operation mode are provided. In the first operation mode, when the MC-mode determination signal S33 generated by the motion prediction/compensation block-size determining circuit 33 shown in FIG. 6 based on the image signal S40 indicates the 16×16, 16×8, or 8×16 mode shown in FIG. 7, the interpolation filter selection circuit 34 selects the 6-tap filter circuit 42 shown in FIG. 8, and when the other modes are designated, the interpolation filter selection circuit 34 selects the 4-tap filter circuit 43 shown in FIG. 8. In the second mode, the 4-tap filter circuit 43 is selected regardless of the designated MC mode.

In the second mode, the interpolation filter selection circuit 34 selects the 4-tap filter circuit 43, and each interpolation pixel signal S(i) at interpolation position i (funny positions), which is blur pixel data for compensating for the pixel precision with a blur display effect, is generated by computing (by linear interpolation) the average of interpolation pixel signals S(b) corresponding to interpolation positions on the diagonal adjacent to the corresponding interpolation position i. Such interpolation pixel signals S(b) are selected from 1/2-pixel-precision interpolation pixel signals S(b) obtained from pixel signals S(A) of pixels A.

In the first mode, the motion prediction/compensation block-size determining circuit 33 performs the same operation as that of the first embodiment.

In the fifth embodiment, the operation mode is selected based on control information stored in the slice header.

According to the fifth embodiment, when coding image signals with a lower bit rate, the image blurring effect, which is provided by the interpolation pixel signals S(i), can be achieved by using the 4-tap filter circuit 43 having a smaller number of taps than the 6-tap filter circuit 42. Accordingly, the number of codes of software and the load on hardware can be reduced.

In contrast, when coding image signals with a higher bit rate, high-quality interpolation pixel signals can be generated by using the 6-tap filter circuit 42.

In this embodiment, the function of the 4-tap filter circuit 43 may be implemented by linear interpolation by using the interpolation computation circuit 45.

Interpolation pixel signals having 1/4 pixel precision can be generated based on the interpolation pixel signals having 1/2 pixel precision generated as described above according to the method defined in H.26L.

Similarly, for generating interpolation pixel signals having 1/8 pixel precision, the 6-tap filter circuit 42 or a filter circuit having a smaller number of taps for generating interpolation pixel signals at 1/4, 2/4, and 3/4 interpolation positions (phases) may be used and are suitably switched according to the MC block mode.

The above-described processing is also performed in the corresponding decoding apparatus.

According to the fifth embodiment, the number of memory accesses can be reduced.

Sixth Embodiment

The communication system of a sixth embodiment is similar to that of the first embodiment, except for the subsequent feature.

In the sixth embodiment, the 6-tap filter circuit 42 is selected regardless of the MC mode.

However, when generating each interpolation pixel signal S(i) at interpolation position i, which is blur pixel data for compensating for the pixel precision with a blur display effect, the 4-tap filter circuit 43 is selected for computing (by linear interpolation) the average of interpolation pixel signals S(b) corresponding to interpolation positions on the diagonal adjacent to the corresponding interpolation position i. Such interpolation pixel signals S(b) are selected from interpolation pixel signals S(b) having 1/2 pixel precision obtained from pixel signals S(A) of pixels A.

In the sixth embodiment, the operation mode is selected based on control information stored in the slice header.

According to the sixth embodiment, when coding image signals with a lower bit rate, the image blurring effect, which is provided by the interpolation pixel signals S(i), can be achieved by using the 4-tap filter circuit 43 having a smaller number of taps than the 6-tap filter circuit 42. Accordingly, the number of codes of software and the load on hardware can be reduced.

In this embodiment, the function of the 4-tap filter circuit 43 may be implemented by linear interpolation by using the interpolation computation circuit 45.

Interpolation pixel signals having 1/4 pixel precision can be generated based on the interpolation pixel signals having 1/2 pixel precision generated as described above according to the method defined in H.26L.

The above-described processing is also performed in the corresponding decoding apparatus.

According to the sixth embodiment, the number of memory accesses can be reduced.

Seventh Embodiment

The communication system of a seventh embodiment is similar to that of the first embodiment, except for the subsequent feature.

In the seventh embodiment, in a first operation mode, the interpolation computation circuit 45 generates each interpolation pixel signal S(i) at interpolation position i by using pixel signals at the four pixel positions A surrounding the corresponding pixel position i according to the following equation (6).

$$S(i)=\{S(A1)+S(A2)+S(A3)+S(A4)+2\}/4 \qquad (6)$$

In a second operation mode, the interpolation computation circuit 45 generates each interpolation pixel signal S(i) at interpolation position i according to computing (by linear interpolation) the average of interpolation pixel signals S(b) corresponding to interpolation positions on the diagonal adjacent to the corresponding interpolation position i. Such interpolation pixel signals S(b) are selected from the interpolation pixel signals S(b) having 1/2 pixel precision generated by the 6-tap filter circuit 42 or the 4-tap filter circuit 43 shown in FIG. 8 using pixel signals S(A) of pixels A.

According to the seventh embodiment, when coding image signals with a lower bit rate, the image blurring effect, which is provided by the interpolation pixel signals S(i), can be achieved by a small amount of computation. Accordingly, the number of codes of software and the load on hardware can be reduced.

In contrast, when coding image signals with a higher bit rate, high-quality interpolation pixel signals can be generated by using the 6-tap filter circuit 42 or the 4-tap filter circuit 43.

Interpolation pixel signals having 1/4 pixel precision can be generated based on the interpolation pixel signals having 1/2 pixel precision generated as described above according to the method defined in H.26L.

Similarly, for generating interpolation pixel signals having 1/8pixel precision, the 6-tap filter circuit 42 or a filter circuit having a smaller number of taps for generating interpolation pixel signals at 1/4, 2/4, and 3/4 interpolation positions (phases) may be used and are suitably switched according to the MC block mode.

The above-described processing is also performed in the corresponding decoding apparatus.

In the above-described embodiment, the H.26L standards are used for image coding and decoding by way of example. The present invention can be applied to certain motion prediction/compensation devices for performing motion prediction/compensation based on a variable block size.

As described above, according to this embodiment, an image-information coding apparatus and decoding apparatus performs motion prediction/compensation based on the motion prediction/compensation block size. More specifically, in such an image-information coding apparatus and decoding apparatus, orthogonal transform, such as DCT or Karhunen-Loeve transform, and motion prediction/compensation with high precision, such as 1/4 pixel precision or 1/8 pixel precision, are performed according to, for example, the H.26L standards. By adaptively switching interpolation filter circuits according to the motion prediction/compensation block size, the amount of computation and the memory band can be considerably reduced while substantially maintaining the image quality.

Eighth Embodiment

An eighth embodiment corresponds to the sixth and seventh aspects of the present invention.

Figure 23:
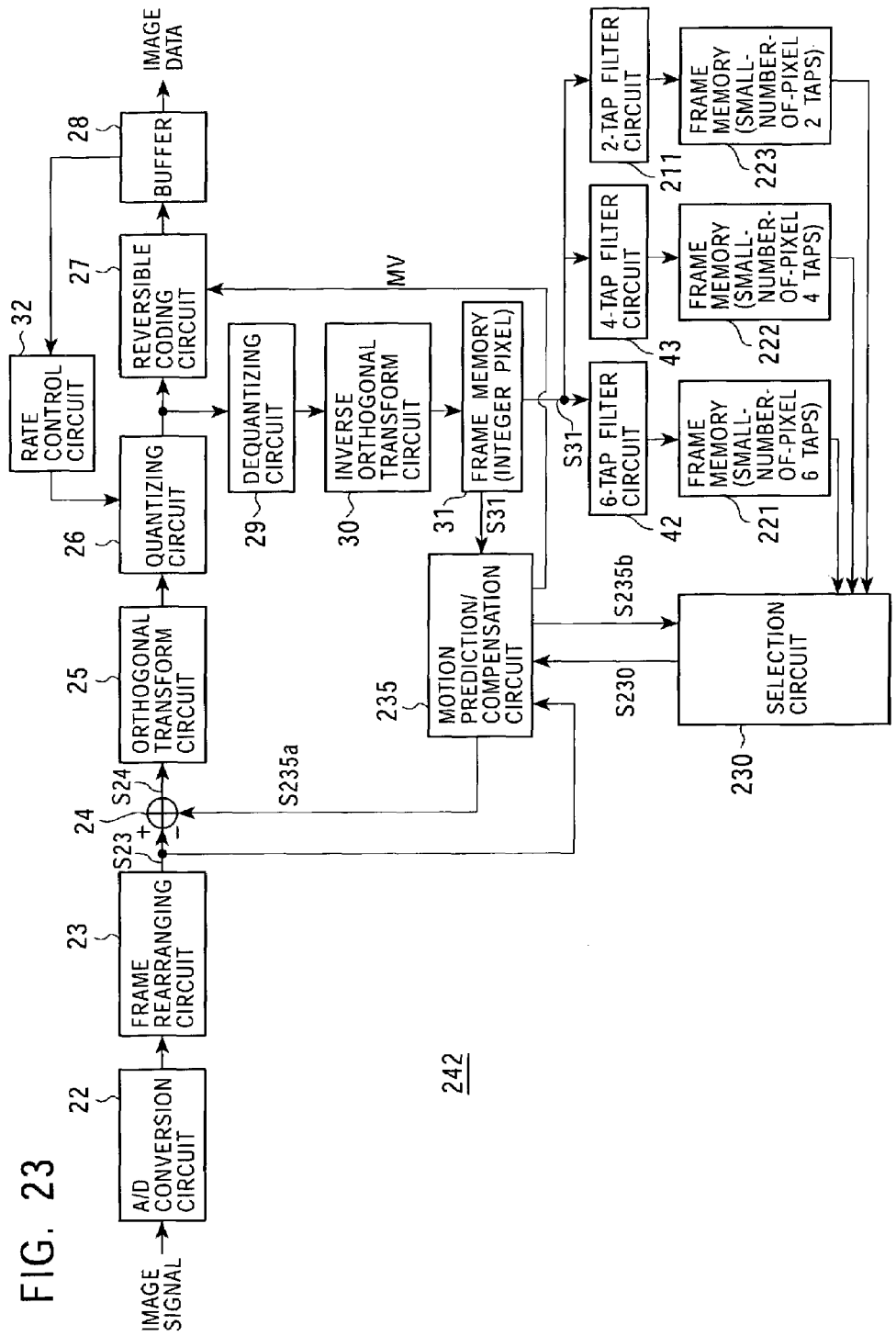
FIG. 23 is a schematic diagram illustrating a coding apparatus according to an eighth embodiment of the present invention.

FIG. 23 is a block diagram illustrating a coding apparatus 242 of the eighth embodiment.

The coding apparatus 242 includes, as shown in FIG. 23, an A/D conversion circuit 22, a frame rearranging circuit 23, a computation circuit 24, an orthogonal transform circuit 25, a quantizing circuit 26, a reversible coding circuit 27, a buffer 28, a dequantizing circuit 29, an inverse orthogonal transform circuit 30, a frame memory 31, a rate control circuit 32, a 6-tap filter circuit 42, a 4-tap filter circuit 43, a 2-tap filter circuit 211, a frame memory 221, a frame memory 222, a frame memory 223, a selection circuit 230, and a motion prediction/compensation circuit 235.

In FIG. 23, the same elements as those shown in FIGS. 6 and 8 of the first embodiment are designated with like reference numerals.

The frame memory 31 corresponds to the first storage circuit of the present invention.

Two of the 6-tap filter circuit 42, the 4-tap filter circuit 43, and the 2-tap filter circuit 211 correspond to the first processing circuit and the second processing circuit of the present invention.

Two of the frame memories 221, 222, and 223 correspond to the second storage circuit and the third storage circuit of the present invention.

The selection circuit 230 corresponds to the selection circuit of the present invention.

The steps of the control processing of each circuit may be included in a program, and the predetermined data processing circuit may be implemented by executing the program.

The 6-tap filter circuit 42 is, for example, a FIR filter. Upon receiving 6 pixel signals having integer pixel precision read from the frame memory 31, the 6-tap filter circuit 42 generates interpolation pixel signals having smaller-number-of-pixel precision, and writes them into the frame memory 221.

In this embodiment, when generating interpolation pixel signals having 1/4 pixel precision, as the coefficients {h1, h2, h3, h4, h5, h6} of the 6-tap filter circuit 42, {1, −5, 20, 20, −5, 1}, for example, are used.

The 4-tap filter circuit 43 is, for example, a FIR filter. Upon receiving 4 pixel signals having integer pixel precision read from the frame memory 31, the 4-tap filter circuit 43 generates interpolation pixel signals having smaller-number-of-pixel precision, and writes them into the frame memory 222.

In this embodiment, as the coefficients {h11, h12, h13, h14} of the 4-tap filter circuit 43, {−1, 5, 5, −1}, for example, are used.

The 2-tap filter circuit 211 is, for example, a FIR filter. Upon receiving 2 pixel signals having integer pixel precision read from the frame memory 31, the 2-tap filter circuit 211 generates interpolation pixel signals having smaller-number-of-pixel precision, and writes them into the frame memory 223.

In this embodiment, as the coefficients {h21, h22} of the 2-tap filter circuit 211, {1, 1}, for example, are used.

The selection circuit 230 reads an interpolation pixel signal S230 having smaller-number-of-pixel precision from the frame memories 221, 222, and 223 based on a selection signal S235b input from the motion prediction/compensation circuit 235, and outputs the interpolation pixel signal S230 to the motion prediction/compensation circuit 235.

Upon receiving an image signal S23 of the target image, the motion prediction/compensation circuit 235 detects the picture type and the MC block size, generates the selection signal S235b based on the detection results, and outputs the selection signal S235b to the selection circuit 230.

The motion prediction/compensation circuit 235 generates motion vector MV and a predictive image signal S235a by using the pixel signal having integer precision read from the frame memory 31 and the interpolation pixel signal S230 having smaller number of pixel precision input from the selection circuit 230.

Figure 24:
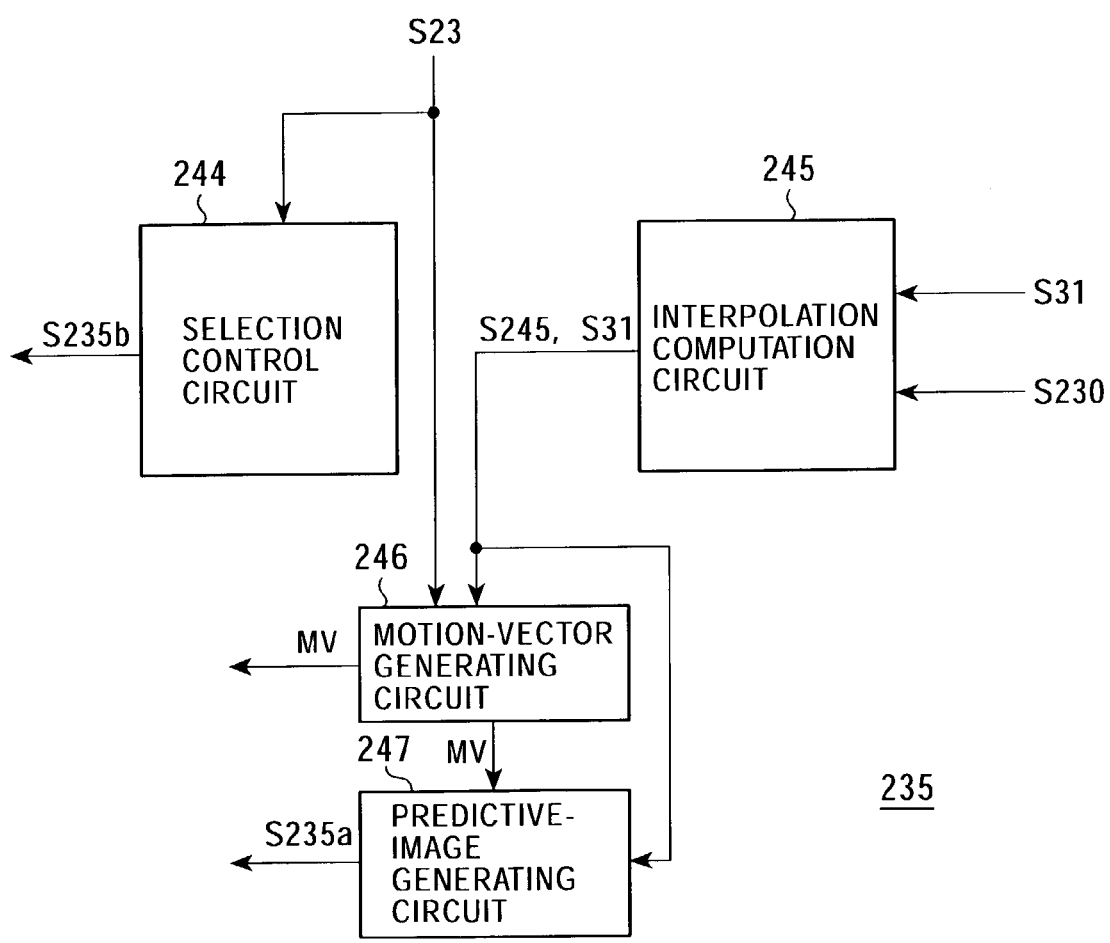
FIG. 24 is a functional block diagram illustrating a motion prediction/compensation circuit shown in FIG. 23.

FIG. 24 is a functional block diagram illustrating the motion prediction/compensation circuit 235.

The motion prediction/compensation circuit 235 includes, as shown in FIG. 24, a selection control circuit 244, an interpolation computation circuit 245, a motion-vector generating circuit 246, and a predictive-image generating circuit 247.

The selection control circuit 244 detects the picture type of the target image and the MC block size based on the image signal S23. When the picture type is P and when the MC block size is greater than 8×8, the selection control circuit 244 outputs the selection signal S235b indicating that the frame memory 221 (6 taps) is to be selected.

(1) When the picture type is P and when the MC block size is 8×8 or smaller, or (2) when the picture type is B and when the MC block size is greater than 8×8, the selection control circuit 244 generates the selection signal S235b indicating that the frame memory 222 (4 taps) is to be selected.

When the picture type is B and when the MC block size is 8×8 or smaller, the selection control circuit 244 generates the selection signal S235b indicating that the frame memory 223 (2 taps) is to be selected.

The interpolation computation circuit 245 performs interpolation processing by using the pixel signal S31 having integer pixel precision input from the frame memory 31 and the interpolation pixel signal S230 having smaller-number-of-pixel precision input from the selection circuit 230 so as to generate an image signal S245 having 1/4 pixel precision. The interpolation computation circuit 245 then outputs the image signal S245 and the pixel signal S31 to the motion-vector generating circuit 246 and the predictive-image generating circuit 247.

The computation processing of the interpolation computation circuit 245 is basically similar to that of the interpolation computation circuit 45 of the first embodiment.

By using the image signal S23 (the first pixel data of the present invention) input from the frame rearranging circuit 23 and a reference image signal (the second image data of the present invention) consisting of the pixel signal S31 and the interpolation pixel signal S245 input from the interpolation computation circuit 245, the motion-vector generating circuit 246 generates the motion vector MV of the target MC block with 1/4 pixel precision, and outputs the motion vector MV to the reversible coding circuit 27 and the predictive-image generating circuit 247.

The predictive-image generating circuit 247 generates the predictive image signal S235a by using the motion vector MV and the reference image signal having 1/4pixel precision consisting of the pixel signal S31 and the interpolation pixel signal S245 input from the interpolation computation circuit 245, and outputs the predictive image signal S235a to the computation circuit 24.

An example of the operation of the coding apparatus 242 shown in FIG. 23 is given below.

The processing until the storage of pixel signals having integer pixel precision in the frame memory 31 is similar to that of the first embodiment.

The pixel signal S31 read from the frame memory 31 is output to the 6-tap filter circuit 42, the 4-tap filter circuit 43, and the 2-tap filter circuit 211.

Then, the above-described filtering processing is performed in the 6-tap filter circuit 42, the 4-tap filter circuit 43, and the 2-tap filter circuit 211, and interpolation pixel signals having smaller-number-of-pixel precision are written into the frame memories 221, 222, and 223, respectively.

The selection control circuit 244 of the motion prediction/compensation circuit 235 shown in FIG. 24 detects the picture type and the MC block size based on the image signal S23 so as to generate the selection signal S235b indicating that one of the frame memories 221, 222, and 223 is to be selected, and outputs the selection signal S235b to the selection circuit 230.

Then, the selection circuit 230 reads the interpolation pixel signal S230 having smaller-number-of-pixel precision from the frame memory 221, 222, or 223 designated by the selection signal S235b, and outputs the interpolation pixel signal S230 to the interpolation computation circuit 245 of the motion prediction/compensation circuit 235.

The interpolation computation circuit 245 then performs interpolation processing by using the pixel signal S31 having integer pixel precision input from the frame memory 31 and the interpolation pixel signal S230 having smaller-number-of-pixel precision input from the selection circuit 230 so as to generate the image signal S245 having 1/4 pixel precision, and outputs the image signal S245 and the pixel signal S31 to the motion-vector generating circuit 246 and the predictive-image generating circuit 247.

Then, by using the image signal S23 input from the frame rearranging circuit 23 and the reference image signal consisting of the pixel signal S31 and the interpolation pixel signal S245 input from the interpolation computation circuit 245, the motion-vector generating circuit 246 generates the motion vector MV of the target MC block, and outputs the motion vector MV to the reversible coding circuit 27 and the predictive-image generating circuit 237.

Subsequently, the predictive-image generating circuit 247 generates the predictive image signal S235a by using the motion vector MV and the reference image signal consisting of the pixel signal S31 and the interpolation pixel signal S245 input from the interpolation computation circuit 245, and outputs the predictive image signal S235a to the computation circuit 24.

In this embodiment, three types of filter circuits, such as the 6-tap filter circuit 42, the 4-tap filter circuit 43, and the 2-tap filter circuit 211, as shown in FIG. 23, are used. However, from four types of filter circuits, such as 8, 6, 4, and 2-tap filters, two or more filter circuits may be employed.

Although in this embodiment the pixel signals are interpolated with 1/4 pixel precision, they may be interpolated with another pixel precision, such as 1/8 pixel precision, to generate the motion vector MV and the predictive image signal. In this case, if an 8-tap filter circuit is employed, filter coefficients {−3, 12, −37, 229, 71, −21, 6, −1} may be used for generating 1/4 interpolation pixel signals at 1/4 interpolation positions, filter coefficients {−3, 12, −39, 158, 158, −39, 12, −3} may be used for generating interpolation pixel signals at 2/4 interpolation positions, and filter coefficients {−1, 6, −21, 71, 229, −37, 12, −3} may be used for generating interpolation pixel signals at 3/4 interpolation positions.

If a 2-tap filter circuit is employed, filter coefficients {3, 1} may be used for generating interpolation pixel signals at 1/4 interpolation positions, filter coefficients {2, 2} may be used for generating interpolation pixel signals at 2/4 interpolation positions, and filter coefficients {1, 3} may be used for generating interpolation pixel signals at 3/4 interpolation positions.

As described above, according to the coding apparatus 242, a reference image signal can be generated by suitably switching the 2-tap filter, the 4-tap filter, and the 6-tap filter according to the MC block type of the image signal S23. Then, by using this reference image signal, motion vectors and predictive image data can be generated.

Ninth Embodiment

A ninth embodiment corresponds to the eighth and ninth aspects of the present invention.

Figure 25:
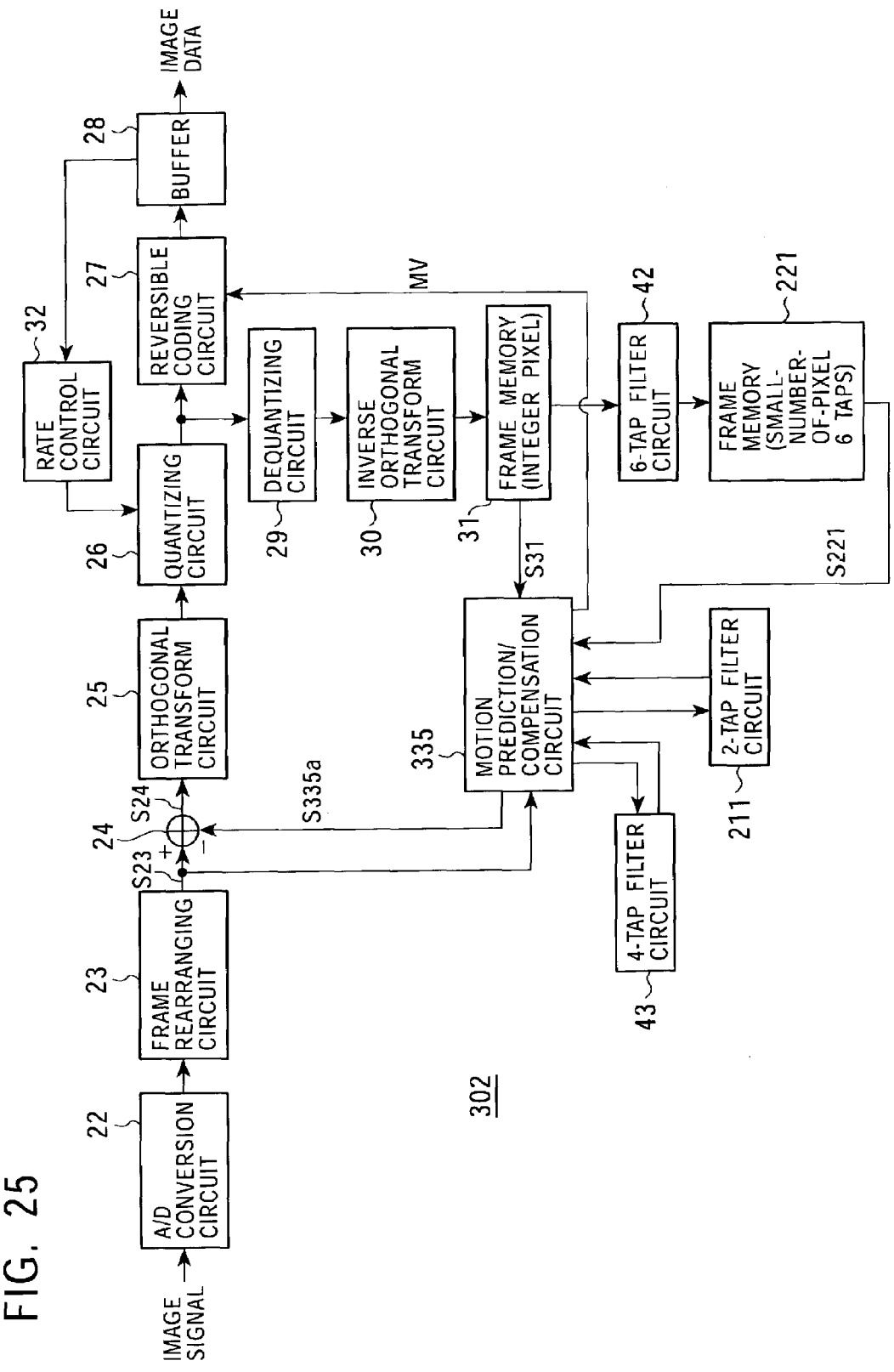
FIG. 25 is a schematic diagram illustrating a coding apparatus according to a ninth embodiment of the present invention.

FIG. 25 is a schematic diagram illustrating a coding apparatus 302 of the ninth embodiment.

The coding apparatus 302 includes, as shown in FIG. 25, an A/D conversion circuit 22, a frame rearranging circuit 23, a computation circuit 24, an orthogonal transform circuit 25, a quantizing circuit 26, a reversible coding circuit 27, a buffer 28, a dequantizing circuit 29, an inverse orthogonal transform circuit 30, a frame memory 31, a rate control circuit 32, a 6-tap filter circuit 42, a 4-tap filter circuit 43, a 2-tap filter circuit 211, a frame memory 221, and a motion prediction/compensation circuit 335.

In FIG. 25, the same elements as those shown in FIGS. 6, 8, and 23 of the first and eighth embodiments are designated with like reference numerals.

The frame memory 31 corresponds to the first storage circuit of the present invention.

The 6-tap filter circuit 42 corresponds to the first processing circuit of the present invention, and the frame memory 221 corresponds to the second storage circuit of the present invention.

The 4-tap filter circuit 43 or the 2-tap filter circuit 211 corresponds to the second processing circuit of the present invention.

The motion prediction/compensation circuit 335 corresponds to the motion-vector generating circuit and the predictive-image generating circuit of the present invention.

The steps of the control processing of each circuit may be included in a program, and the predetermined data processing circuit may be implemented by executing the program.

The 6-tap filter circuit 42 is, for example, a FIR filter. Upon receiving 6 pixel signals having integer pixel precision (the first image data of the present invention) read from the frame memory 31, the 6-tap filter circuit 42 generates interpolation pixel signals having smaller-number-of-pixel precision, and writes them into the frame memory 221.

In this embodiment, when generating interpolation pixel signals having 1/4 pixel precision, as the coefficients {h1, h2, h3, h4, h5, h6} of the 6-tap filter circuit 42, {1, −5, 20, 20, −5, 1}, for example, are used.

The 4-tap filter circuit 43 is, for example, a FIR filter. Upon receiving 4 pixel signals having integer pixel precision read from the frame memory 31 via the motion prediction/compensation circuit 335, the 4-tap filter circuit 43 generates interpolation pixel signals having smaller-number-of-pixel precision, and writes them into the motion prediction/compensation circuit 335.

In this embodiment, as the coefficients {h11, h12, h13, h14} of the 4-tap filter circuit 43, {−1, 5, 5, −1}, for example, are used.

The 2-tap filter circuit 211 is, for example, a FIR filter. Upon receiving 2 pixel signals having integer pixel precision read from the frame memory 31 via the motion prediction/compensation circuit 335, the 2-tap filter circuit 211 generates interpolation pixel signals having smaller-number-of-pixel precision, and writes them into the motion prediction/compensation circuit 335.

In this embodiment, as the coefficients {h21, h22} of the 2-tap filter circuit 211, {1, 1}, for example, are used.

Upon receiving the image signal S23 (the predetermined image data of the present invention) of the target image, the motion prediction/compensation circuit 335 detects the picture type and the MC block size. Based on a detection result, the motion prediction/compensation circuit 335 generates a motion vector MV and a predictive image signal S335a by using the image signal S23, the pixel signal S31 having integer pixel precision read from the frame memory 31, an interpolation pixel signal S221 having smaller-number-of-pixel precision read from the frame memory 221, and the interpolation pixel signal input from the 4-tap filter circuit 43 and the 2-tap filter circuit 211.

Figure 26:
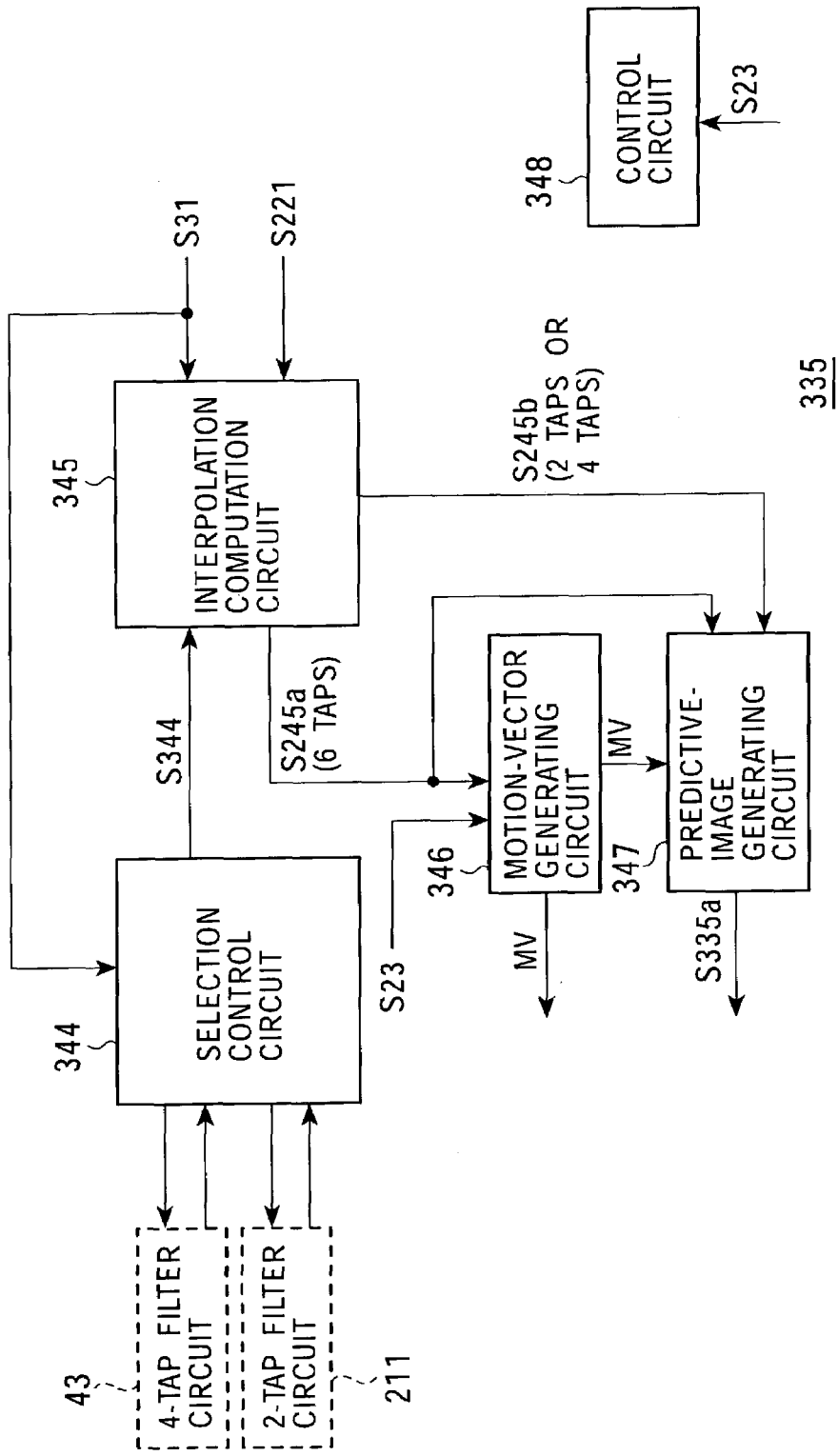
FIG. 26 is a functional block diagram illustrating a motion prediction/compensation circuit shown in FIG. 25.

FIG. 26 is a functional block diagram illustrating the motion prediction/compensation circuit 335.

The motion prediction/compensation circuit 335 includes, as shown in FIG. 26, a selection control circuit 344, an interpolation computation circuit 345, a motion-vector generating circuit 346, a predictive-image generating circuit 347, and a control circuit 348.

The motion-vector generating circuit 346 corresponds to the motion-vector generating circuit of the present invention. The predictive-image generating circuit 347 and the control circuit 348 correspond to the predictive-image generating circuit of the present invention.

Under the control of the control circuit 348, the selection control circuit 344 outputs the pixel signal S31 having integer pixel precision read from the frame memory 31 to the designated filter circuit, i.e., the 4-tap filter circuit 443 or the 2-tap filter circuit 211. Then, in response to the pixel signal S31, the selection control circuit 344 receives an interpolation pixel signal S344 having smaller-number-of-pixel precision input from the designated filter circuit, and outputs the interpolation pixel signal S344 to the interpolation computation circuit 345.

The interpolation computation circuit 345 performs first processing as follows. Under the control of the control circuit 348, the interpolation computation circuit 345 performs interpolation processing by using the pixel signal S31 having integer pixel precision input from the frame memory 31 and the interpolation pixel signal S221 having smaller-number-of-pixel precision input from the frame memory 221 so as to generate an image signal S245a having 1/4 pixel precision.

The interpolation computation circuit 345 also performs second processing as follows. Under the control of the control circuit 348, the interpolation computation circuit 345 performs interpolation processing by using the pixel signal S31 having integer pixel precision and the interpolation pixel signal S344 having smaller-number-of-pixel precision input from the selection control circuit 344 so as to generate an image signal S245b having 1/4 pixel precision.

The interpolation computation circuit 345 outputs the image signal S245a generated in the first processing to the motion-vector generating circuit 346, and outputs the image signal S245b generated in the second processing to the predictive-image generating circuit 347.

The computation processing of the interpolation computation circuit 345 is basically similar to that of the interpolation computation circuit 45 of the first embodiment.

The motion-vector generating circuit 346 generates a motion vector MV of the designated MC block with 1/4 pixel precision by using the image signal S23 input from the frame rearranging circuit 23 and the image signal S245a having 1/4 pixel precision (reference image signal, i.e., the second image data of the present invention) input from the interpolation computation circuit 345. The motion-vector generating circuit 346 then outputs the motion vector MV to the reversible coding circuit 27 and the predictive-image generating circuit 347.

When the processing using the 6-tap filter circuit 42 is designated, the predictive-image generating circuit 347 generates the predictive image signal S335a under the control of the control circuit 348 by using the motion vector MV and the image signal S245a input from the interpolation computation circuit 345, and outputs the predictive image signal S335a to the computation circuit 24.

When the processing using the 4-tap filter circuit 43 or the 2-tap filter circuit 211 is designated, the predictive-image generating circuit 347 generates the predictive image signal S335a under the control of the control circuit 348 by using the motion vector MV and the image signal S245b input from the interpolation computation circuit 345, and outputs the predictive image signal S335a to the computation circuit 24.

The control circuit 348 detects the picture type and the MC block size based on the image signal S23. When the picture type is P and when the MC block size is greater than 8×8, the control circuit 348 designates the processing using the 6-tap filter circuit 42.

(1) When the picture type is P and when the block size is 8×8 or smaller, or (2) when the picture type is B and when the block size is greater than 8×8, the control circuit 348 designates the processing using the 4-tap filter circuit 43.

When the picture type is B and when the MC block size is 8×8 or smaller, the control circuit 348 designates the processing using the 2-tap filter circuit 211.

An example of the operation of the coding apparatus 302 shown in FIG. 25 is given below.

The processing until the storage of the pixel signal having integer pixel precision in the frame memory 31 is similar to that of the first embodiment.

The pixel signal S31 having integer pixel precision read from the frame memory 31 is output to the 6-tap filter circuit 42.

In the 6-tap filter circuit 42, the above-described filtering processing is performed, and the interpolation pixel signal having smaller-number-of-pixel precision is written into the frame memory 221.

The interpolation computation circuit 345 performs first processing as follows. Under the control of the control circuit 348, the interpolation computation circuit 345 performs interpolation processing by using the pixel signal S31 having integer pixel precision input from the frame memory 31 and the interpolation pixel signal S221 having smaller-number-of-pixel precision input from the frame memory 221 so as to generate an image signal S245a having 1/4 pixel precision.

The motion-vector generating circuit 346 generates the motion vector MV of the MC block by using the image signal S23 input from the frame rearranging circuit 23 and the image signal S245a (reference image signal) input from the interpolation computation circuit 345, and outputs the motion vector MV to the reversible coding circuit 27 and the predictive-image generating circuit 347.

The control circuit 348 detects the picture type and the MC block size based on the image signal S23, and designates one of the 6-tap filter circuit 42, the 4-tap filter circuit 43, and the 2-tap filter circuit 211 based on detection results.

When the processing using the 6-tap filter circuit 42 is designated by the control circuit 348, the predictive-image generating circuit 347 generates the predictive image signal S335a by using the motion vector MV and the image signal S245a input from the interpolation computation circuit 345, and outputs the predictive image signal S335a to the computation circuit 24.

When the processing using the 4-tap filter circuit 43 is designated by the control circuit 348, the selection control circuit 344 outputs the pixel signal S31 having integer pixel precision to the 4-tap filter circuit 43, and outputs a response from the 4-tap filter circuit 43 to the interpolation computation circuit 345.

Then, the interpolation computation circuit 345 performs interpolation processing by using the pixel signal S31 having integer pixel precision and the interpolation pixel signal S344 having smaller-number-of-pixel precision input from the selection control circuit 344 so as to generate the image signal S245b having 1/4pixel precision, and outputs it to the predictive-image generating circuit 347.

The predictive-image generating circuit 347 then generates the predictive image signal S335a based on the control of the control circuit 348 by using the motion vector MV and the image signal S245b input from the interpolation computation circuit 345, and outputs the predictive image signal S335a to the computation circuit 24.

When the processing using the 2-tap filter circuit 211 is designated by the control circuit 348, the selection control circuit 344 outputs the pixel signal S31 having integer pixel precision to the 2-tap filter circuit 211, and outputs a response from the 2-tap filter circuit 211 to the interpolation computation circuit 345.

Then, the interpolation computation circuit 345 performs interpolation by using the pixel signal S31 having integer pixel precision and the interpolation pixel signal S344 having smaller-number-of-pixel precision input from the selection control circuit 344 so as to generate the image signal S245b having 1/4 pixel precision, and outputs it to the predictive-image generating circuit 347.

The predictive-image generating circuit 347 generates the predictive image signal S335a under the control of the control circuit 348 by using the motion vector MV and the image signal S245b input from the interpolation computation circuit 345, and outputs the predictive image signal S335a to the computation circuit 24.

In this embodiment, three types of filter circuits, such as the 6-tap filter circuit 42, the 4-tap filter circuit 43, and the 2-tap filter circuit 211, as shown in FIG. 25, are used. However, from four types of filter circuits, such as 8, 6, 4, and 2-tap filters, two or more filter circuits may be employed.

Although in this embodiment the pixel signals are interpolated with 1/4 pixel precision, they may be interpolated with another pixel precision, such as 1/8 pixel precision, to generate a motion vector MV and a predictive image signal. In this case, if an 8-tap filter circuit is employed, filter coefficients {−3, 12, −37, 229, 71, −21, 6, −1} may be used for generating 1/4 interpolation pixel signals at 1/4 interpolation positions, filter coefficients {−3, 12, −39, 158, 158, −39, 12, −3} may be used for generating interpolation pixel signals at 2/4 interpolation positions, and filter coefficients {−1, 6, −21, 71, 229, −37, 12, −3} may be used for generating interpolation pixel signals at 3/4 interpolation positions.

If a 2-tap filter circuit is employed, filter coefficients {3, 1} may be used for generating interpolation pixel signals at 1/4 interpolation positions, filter coefficients {2, 2} may be used for generating interpolation pixel signals at 2/4 interpolation positions, and filter coefficients {1, 3} may be used for generating interpolation pixel signals at 3/4 interpolation positions.

As described above, according to the coding apparatus 302, a reference image signal can be generated by suitably switching the 2-tap filter, the 4-tap filter, and the 6-tap filter according to the MC block type of the image signal S23. By using this reference signal, motion vectors and predictive image data can be generated. According to the ninth embodiment, the number of frame memories for storing pixel signals having smaller-number-of-pixel precision therein is smaller than that of the eighth embodiment.

What is claimed is:

1. An image processing apparatus for generating pixel data forming second image data by interpolating pixel data of first image data read from a storage circuit when generating a motion vector of predetermined image data by using the second image data, the apparatus comprising:
    a first processing circuit for generating interpolation pixel data forming the second image data by using pixel data for a first number of pixels of the first image data;
    a second processing circuit for generating interpolation pixel data forming the second image data by using pixel data for a second number of pixels, which is smaller than the first number of pixels of the first image data;
    a selection circuit for selecting one of said first processing circuit and said second processing circuit to generate the interpolation pixel data according to a motion compensation mode; and
    a computation circuit for performing computation by using the interpolation pixel data so as to generate new interpolation pixel data, wherein
    said selection circuit selects said second processing circuit, and, by using the interpolation pixel data generated by said second processing circuit, said computation circuit generates blur pixel data for compensating for pixel precision with a blur display effect as one of the new interpolation pixel data,
    said second processing circuit generates the interpolation pixel data corresponding to an interpolation position located between adjacent pixel positions, and
    said computation circuit performs computation by using the interpolation pixel data corresponding to interpolation positions located at two ends on a diagonal passing through an interpolation position corresponding to the new interpolation pixel data so as to generate the blur pixel data.

2. An image processing apparatus for generating pixel data forming second image data by interpolating pixel data of first image data read from a storage circuit when generating a motion vector of predetermined image data by using the second image data, the apparatus comprising:
    a first processing circuit for generating interpolation pixel data forming the second image data by using pixel data for a first number of pixels of the first image data;
    a second processing circuit for generating interpolation pixel data forming the second image data by using pixel data for a second number of pixels, which is smaller than the first number of pixels of the first image data;

a selection circuit for selecting one of said first processing circuit and said second processing circuit to generate the interpolation pixel data according to a motion compensation mode; and a computation circuit for performing computation by using the interpolation pixel data so as to generate new interpolation pixel data, wherein said selection circuit selects said second processing circuit, and, by using the interpolation pixel data generated by said second processing circuit, said computation circuit generates blur pixel data for compensating for pixel precision with a blur display effect as one of the new interpolation pixel data, and when a plurality of types of blocks, which are used as a unit for generating a motion vector, are defined, and when the motion vector is generated by designating the type of block in the predetermined image data as the unit, said selection circuit selects, in a first operation mode, said first processing circuit when the designated type of block has a predetermined size or greater, and selects said second processing circuit when the designated type of block has a size smaller than the predetermined size, and said selection circuit selects, in a second operation mode, said second processing circuit regardless of the designated type of block, and said selection circuit makes the selection so that the interpolation pixel data used for generating the blur pixel data is generated by said second processing circuit regardless of the first operation mode or the second operation mode.

3. An image processing apparatus for generating pixel data forming second image data by interpolating pixel data of first image data read from a storage circuit when generating a motion vector of predetermined image data by using the second image data, the apparatus comprising:

a first processing circuit for generating interpolation pixel data forming the second image data by using pixel data for a first number of pixels of the first image data;

a second processing circuit for generating interpolation pixel data forming the second image data by using pixel data for a second number of pixels, which is smaller than the first number of pixels of the first image data;

a selection circuit for selecting one of said first processing circuit and said second processing circuit to generate the interpolation pixel data according to a motion compensation mode; and a computation circuit for performing computation by using the interpolation pixel data so as to generate new interpolation pixel data, wherein said selection circuit selects said second processing circuit, and, by using the interpolation pixel data generated by said second processing circuit, said computation circuit generates blur pixel data for compensating for pixel precision with a blur display effect as one of the new interpolation pixel data, and in a first operation mode, said computation circuit performs computation by using the pixel data corresponding to positions around an interpolation position of the blur pixel data so as to generate blur pixel data, and, in a second operation mode, said computation circuit performs computation by using the interpolation pixel data corresponding to interpolation positions located at two ends on a diagonal passing through an interpolation position corresponding to the new interpolation pixel data so as to generate the blur pixel data.

\* \* \* \* \*